US007323041B2

(12) United States Patent
Yoshida et al.

(10) Patent No.: US 7,323,041 B2
(45) Date of Patent: Jan. 29, 2008

(54) GAS STORAGE CANISTER

(75) Inventors: Hiroyuki Yoshida, Saitama (JP); Koji Yamazaki, Saitama (JP)

(73) Assignees: Mahle Filter Systems Japan Corporation, Tokyo (JP); Osaka Gas Co., Ltd., Osaka-shi (JP)

( * ) Notice: Subject to any disclaimer, the term of this patent is extended or adjusted under 35 U.S.C. 154(b) by 284 days.

(21) Appl. No.: 11/091,932

(22) Filed: Mar. 29, 2005

(65) Prior Publication Data

US 2005/0223900 A1 Oct. 13, 2005

(30) Foreign Application Priority Data

Mar. 30, 2004 (JP) ............................ 2004-098381
Mar. 30, 2004 (JP) ............................ 2004-098382

(51) Int. Cl.
*B01D 53/02* (2006.01)
*F02M 25/08* (2006.01)

(52) U.S. Cl. .......................... 96/132; 96/153; 123/519

(58) Field of Classification Search .................. 96/108, 96/121, 131, 132, 147, 153; 123/518, 519, 123/520, 521
See application file for complete search history.

(56) References Cited

U.S. PATENT DOCUMENTS 4,951,643 A 8/1990 Sato et al.
2001/0020418 A1 9/2001 Yamafuji et al.
2005/0247202 A1* 11/2005 Seki ............................ 96/146
2006/0144228 A1* 7/2006 Reiners et al. ................ 95/144

FOREIGN PATENT DOCUMENTS

| | | | |
|---|---|---|---|
| CA | 2 489 318 | A1 | 12/2003 |
| EP | 1 113 163 | A2 | 7/2001 |
| JP | 2001-145832 | A | 5/2001 |
| JP | 2001-248504 | A | 9/2001 |
| JP | 2003-311118 | A | 11/2003 |
| WO | WO 2004/007939 | A1 | 1/2004 |

* cited by examiner

*Primary Examiner*—Frank M. Lawrence
(74) *Attorney, Agent, or Firm*—Foley & Lardner LLP

(57) ABSTRACT

A gas storage canister for use in an automotive vehicle, includes a case having first and second end sections which are opposite to each other in a direction of flow of gas. The first end section has a gas inflow port and a gas outflow port. The second end section has an atmosphere-opened port. A gas adsorbing material is disposed inside the case. Additionally, a heat accumulative agent is provided including a phase changing material which causes absorption and release of latent heat to occur in accordance with a temperature variation. The heat accumulative material is mixed with the gas adsorbing material and disposed inside the case. Here, a mix proportion of the heat accumulative agent changes in the gas flow direction between the first and second end sections.

16 Claims, 16 Drawing Sheets

GAS STORAGE CANISTER

BACKGROUND OF THE INVENTION

This invention relates to improvement in a gas storage canister, for example, using activated carbon or the like in order to treat fuel vapor of an automotive internal combustion engine.

In an automotive internal combustion engine for instance, a gas storage canister is provided to be able to store and release fuel vapor for the purpose of preventing fuel vapor generated in a fuel tank from releasing out of an automotive vehicle. Fuel vapor generated, for example, after a vehicle stopping is temporarily stored in the gas storage canister and is released together with fresh air from the gas storage canister to be introduced into the engine when the engine is operated after the vehicle stopping. Here, the following fact is known: In the gas storage canister using a gas adsorbing material such as activated carbon or the like, an exothermic reaction occurs when fuel vapor is adsorbed to the gas adsorbing material, so that the temperature of the gas adsorbing material rises. This temperature rise lowers a gas adsorbing ability of the gas adsorbing material. In contrast, an endothermic reaction occurs when fuel vapor is desorbed from the gas adsorbing material, so that the temperature of the gas adsorbing material lowers. This temperature drop lowers a gas desorbing ability of the gas adsorbing material.

In order to hold down the temperature variation occurring during such gas adsorption and desorption operations of the canister, mixing a heat accumulative agent with a gas adsorbing material, such as activated carbon has heretofore been discussed. For example, Japanese Patent Provisional Publication No. 2001-248504 discloses a gas storage canister in which the gas adsorbing material is mixed with a heat accumulative agent made of a material having a large specific heat, such as a metal.

However, when a large quantity of heat accumulative agent is blended in the canister, a proportion of the gas adsorbing material necessary for obtaining the inherent gas adsorbing effect relatively lowers, so that a material utilizing a phase changing material as a heat accumulative agent recently attracts the technicians' attention. For example, Japanese Patent Provisional Publication No. 2001-145832 and 2003-311118 disclose a latent heat accumulative type gas adsorbing material formed by sealing in micro-capsules a phase changing material of an aliphatic hydrocarbon, etc. in which the adsorption and discharge of latent heat occur in accordance with the phase change, thereby forming powdered heat accumulative agent including the phase changing material. This powdered heat accumulative agent is mixed with a gas adsorbing material so as to form an integral product, or depositing this powdered heat accumulative agent on a surface of a granular adsorbing material (activated carbon). According to such a heat accumulative agent utilizing latent heat occurring due to the phase change, a temperature variation occurring due to the adsorption and desorption of the fuel vapor is held down by even a comparatively small quantity of heat accumulative agent, and the adsorption and desorption performance of the canister is improved.

SUMMARY OF THE INVENTION

The above canister is provided at one end, in the gas flow direction in a gas flow passage in a case formed linearly or in a U-shaped or another manner, with vapor inflow and outflow portions and at the other end thereof with an atmosphere-opened port. The absorption of the vapor proceeds forward the side of the atmosphere-opened port gradually from the side of the inflow and outflow portions. Conversely, the desorption of the vapor proceeds from the side of the atmosphere-opened port gradually toward the side of the inflow and outflow portions. Therefore, the temperature distribution of the canister during the adsorption and desorption of vapor is not uniform. In consequence, when the heat accumulative agent is blended in each portion uniformly, the improvement of the adsorption rate owing to the heat accumulative effect does not necessarily become highest.

When the phase change does not occur due to the temperature variation of the canister in the heat accumulative agent utilizing the latent heat accompanied by the phase change, the adsorption or discharge of the heat does not occur. Therefore, it is substantially difficult to obtain both effects, i.e. a temperature rise suppressing effect during the adsorption of vapor and a temperature drop suppressing effect during the desorption of vapor. Due to the relation between the phase change temperature and the atmospheric temperature under the condition of use of the canister, the effect is necessarily obtained either during the adsorption of the vapor or during the desorption of the vapor. Therefore, it is necessary that such a heat accumulative agent be utilized as the heat accumulative agent for the canister with the property peculiar to such a phase changing material taken into consideration.

Therefore, it is an object of the present invention is to provide an improved gas storage canister which can effectively overcome drawbacks encountered in conventional gas storage canisters.

Another object of the present invention is to provide an improved gas storage canister which is largely increased in gas adsorbing quantity as compared with the conventional gas storage canisters.

A further object of the present invention is to provide an improved gas storage canister which accomplishes suppression of temperature rise due to adsorption of latent heat and suppression of temperature drop due to release of latent heat in such a manner as to make a temperature distribution uniform inside the gas storage canister.

An aspect of the present invention resides in a gas storage canister comprising a case including first and second end sections which are opposite to each other in a direction of flow of gas, the first end section having a gas inflow port and a gas outflow port, the second end section having an atmosphere-opened port. A gas adsorbing material is disposed inside the case. Additionally, a heat accumulative agent is provided including a phase changing material which causes absorption and release of latent heat to occur in accordance with a temperature variation. The heat accumulative material is mixed with the gas adsorbing material and disposed inside the case. Here, a quantity of the heat accumulative agent changes in the gas flow direction between the first and second end sections.

Another aspect of the present invention resides in a gas storage canister comprising a case including first and second end sections which are opposite to each other in a direction of flow of gas, the first end section having a gas inflow port and a gas outflow port, the second end section having an atmosphere-opened port. A gas adsorbing material is disposed inside the case. Additionally, a heat accumulative agent is provided including a phase changing material which causes absorption and release of latent heat to occur in accordance with a temperature variation. The heat accumulative material is mixed with the gas adsorbing material and disposed inside the case. Here, a mix proportion of the heat accumulative agent changes in the gas flow direction between the first and second end sections.

A further aspect of the present invention resides in a gas storage canister comprising a case including first and second end sections which are opposite to each other in a direction of flow of gas, the first end section having a gas inflow port and a gas outflow port, the second end section having an atmosphere-opened port. A gas adsorbing material is disposed inside the case. Additionally, a heat accumulative agent is provided including a phase changing material which causes absorption and release of latent heat to occur in accordance with a temperature variation. The heat accumulative material is mixed with the gas adsorbing material and disposed in the case. Here, the heat accumulative agent includes a plurality kinds of heat accumulative agents which are different in phase change temperature from each other, and quantities of the heat accumulative agents are different respectively at locations along the gas flow direction between the first and second end sections.

BRIEF DESCRIPTION OF THE DRAWINGS

In the drawings, like reference numerals designate like parts and elements throughout all figures, in which.

DETAILED DESCRIPTION OF THE INVENTION

Figure 1:
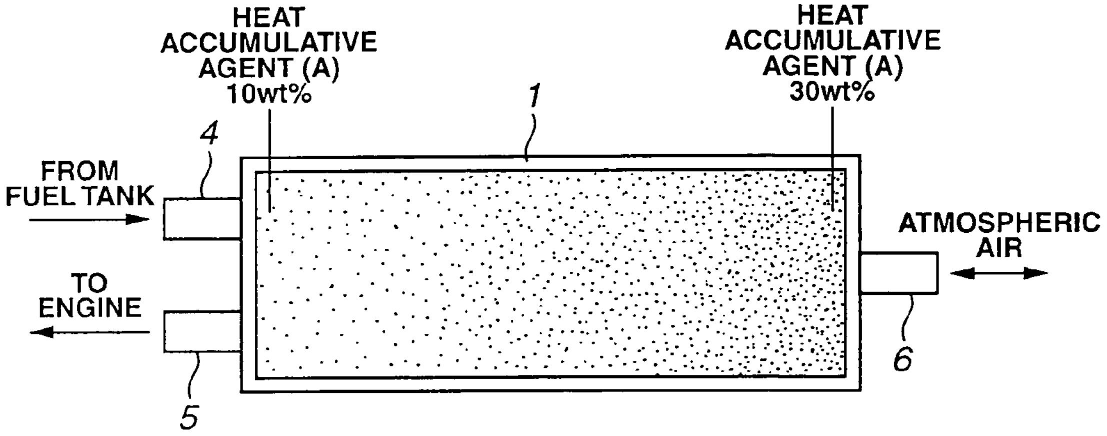
FIG. 1 is an explanatory view of a gas storage canister of Example 1-1 according to a first embodiment of the present invention.

A first embodiment of the present invention will be discussed.

In a gas storage canister according to this embodiment, a heat accumulative agent utilizing a phase changing material which causes the adsorption and discharge of latent heat to occur in accordance with temperature variation is mixed with a gas adsorbing material, and the mixture thus obtained is packed in the case. Vapor inflow and outflow portions are provided at one end of a flow passage with respect to the direction of vapor flow, and an atmosphere-opened port at the other end thereof. Especially, a mix proportion of the heat accumulative agent is not uniform, and this proportion varies in the direction of a flow between the inflow and outflow portions and atmosphere-opened port.

In short, the mix proportion of the heat accumulative agent is set optimum at each portion of the canister with the temperature distribution of the canister during the adsorption of the vapor or that during the desorption thereof taken into consideration.

According to this embodiment, it is preferable that a heat accumulative agent of which the phase change temperature is higher than the atmospheric temperature under the conditions of use of the canister, and that the mix proportion of this heat accumulative agent is relatively high at the side of the atmosphere-opened port.

In another case, a heat accumulative agent of which the phase change temperature is lower than the atmospheric temperature thereof under the condition of use of the canister is relatively high at the side of the inflow/outflow portion.

In short, during the adsorption time in which a heating reaction is carried out, the temperature of the gas adsorbing material, i.e. the temperature of the canister rises. The holding down of the temperature rise during this gas adsorption time by a heat accumulative agent utilizing latent heat will be discussed. When the temperature condition is close to the atmospheric temperature condition before the gas adsorption, the heat accumulative agent is in prior the phase changing time (for example, a solid phase) which is higher than the atmospheric temperature condition. It is necessary that a phase change (to, for example, a liquid phase) be conducted by a temperature rise owing to a gas adsorption operation. Therefore, a heat accumulative agent of which the phase change temperature is higher than the atmospheric temperature assumed under the condition of use of the canister has to be used. In general, the temperature of the atmosphere-opened port side portion rises highest during the adsorption time. When the heat accumulative agent is mixed in large quantities in the atmosphere-opened port side portion, the quantity of heat as latent heat capable of being absorbed becomes high. Accordingly, the temperature of each portion of the canister during the adsorption of vapor comes close to a level of uniform temperature distribution.

During the desorption time in which a heat adsorption reaction is conducted, the temperature of the gas adsorbing material, i.e. the temperature of the canister lowers. The holding down of the temperature drop during the desorption time by a heat accumulative agent will be discussed. In the temperature condition close to the atmospheric temperature condition prior to the desorption, the heat accumulative agent is in prior phase changing time (for example, a liquid phase), it is necessary to change the phase (to, for example, a solid phase) due to the temperature drop caused by the desorption operation. Therefore, a heat accumulative agent of which the phase change temperature is lower than the atmospheric temperature assumed under the condition of use of the canister is needed. In general, during the desorption time, the temperature of the side of the inflow/outflow portion becomes the lowest. When the heat accumulative agent is mixed in large quantities in the inflow/outflow portion, the quantity of heat capable of being discharged as latent heat becomes high. Accordingly, the temperature of each portion of the canister at the time of desorption operation comes closer to uniform temperature distribution.

According to this embodiment, it is preferable that the mix proportion (the ratio of the heat accumulative agent to a total quantity of the gas adsorbing material and heat accumulative agent) of each portion of the canister be within the range of 0 to 40 wt %. When the heat accumulative agent is excessively much, the ratio of the gas adsorbing material naturally having an adsorption effect relatively decreases. Therefore, even when the temperature variation is held down, it conversely becomes disadvantageous with respect to the quantity of adsorption.

In one mode of this embodiment of the present invention, the interior of the case is partitioned into a plurality of regions along the direction of flow, and the mix portion of the heat accumulative agent varies in a stepped manner so that the mix proportion of the heat accumulative agent differs in each region. There may be a region where only a gas adsorbing material with which a gas adsorbing material is not mixed is housed may be provided.

The divisional regions may be formed physically by gas permeable partition walls, or formed into a plurality of partitioned regions without being provided with physical partitioning walls.

In one mode of this embodiment of the present invention, the mix proportion of the heat accumulative agent varies continuously in the direction of flow without partitioning the interior of the case clearly into a plurality of regions.

As the heat accumulative agent, a phase changing material which makes adsorption and release of latent heat in accordance with a temperature change is used, in which a variety of modes of the phase changing agent may be used so that the phase changing material is not limited to a particular one. For example, the phase changing agent is fine or powdered phase changing agent which is formed of micro-capsules each of which contains a phase changing material which makes adsorption and release of latent heat in accordance with a temperature change, as disclosed in Japanese Patent Provisional Publications 2001-145832 and 2003-311118 may be used, so that these Japanese Patent Provisional Publications are incorporated herein by reference.

Preferably, the heat accumulative agent is used as formed heat accumulative agent which is formed by mixing the fine phase changing agent with a binder to form a mixture, and by forming the mixture into granule. This formed accumulative agent is mixed with granular gas adsorbing material in order to be used in the gas storage canister.

The phase changing material is known in the above Japanese Patent Provisional Publications 2001-145832 and 2003-311118 and is preferably an organic or inorganic compound(s) having a melting point ranging from 10 to 80° C. Examples of the phase changing material are normal or straight-chain aliphatic hydrocarbons such as tetradecane, pentadecane, hexadecane, heptadecane, octadecane, nonadecane, eicosane, heneicosane, docosane, natural wax, petroleum wax, hydrate of inorganic compounds such as $LiNO_3 \cdot 3H_2O$, $Na_2SO_4 \cdot 10H_2O$, $Na_2HPO_4 \cdot 12H_2O$, fatty acids such as capric acid and lauric acid, higher alcohols having the carbon number ranging from 12 to 15, and esters such as methyl palmitate and methyl stearate. These phase changing materials may be used in combination (of two or more compounds or phase changing materials). The phase changing material is used as a core material of the micro-capsule. The micro-capsule is formed by known methods such as a coacervation method, an in-situ method (or interface reaction method) and the like. The micro-capsule has an outer shell which is formed of known materials such as melamine, gelatin, glass and the like. The micro-capsule of the heat accumulative agent preferably has a particle diameter ranging from about several μm to about several ten μm. If the particle diameter of the micro-capsule is excessively small, the rate occupied by the outer shell constituting the micro-capsule increases so that the rate occupied by the phase changing material repeating its dissolution and solidification decreases, thereby lowering a heat reservation amount of the powdered heat accumulative agent per unit volume. In contrast, if the particle diameter of the micro-capsule is excessively large, the strength of the micro-capsule is required to be increased thereby increasing the rate occupied by the outer shell constituting the micro-capsule, thus lowering the heat reservation amount of the powdered heat accumulative agent per unit volume.

In the present invention, it is preferable that the powdered heat accumulative agent formed by the micro-encapsulation is mixed with the binder and formed into a suitable shape having suitable dimensions, thereby obtaining the granular formed heat accumulative agent. Since only the heat accumulative material is formed using the binder, breakage of the micro-capsules during formation can be suppressed to the minimum. Although a variety of binders may be used as the binder of the present invention, thermosetting resin(s) such as phenol resin and acrylic resin is preferably used from the viewpoints of stability against temperature and solvent required by the final product or vapor storage canister. This granular formed heat accumulative agent is used upon being mixed with the similarly granular gas adsorbing material thereby suppressing separation of them upon receiving vibration while ensuring a desired heat reservation effect. Additionally, suitable clearances can be secured between granules of the formed heat accumulative agent and the gas adsorbing material thereby preventing adsorption and desorption of vapor from being degraded while maintaining a pressure loss of the vapor storage canister at a low value. Further, the outer surface of granule of the gas adsorbing material is not covered with the powdered heat accumulative agent, and therefore baneful effects such as lowering an adsorption rate cannot be made. Here, the granular formed heat accumulative agent preferably has particle diameters ranging from about several hundreds μm to about several mm.

The size of the granular formed heat accumulative agent and the size of the granular gas adsorbing material are preferably the same or similar so as to suppress separation of them upon time lapse and to suitably secure passages through which gas flows. In concrete, the average particle diameter of the formed heat accumulative agent is preferably within a range of 10 to 300%, more preferably within a range of 50 to 150%, of the average particle diameter of the gas adsorbing material.

As the above gas adsorbing material, a variety of gas adsorbing material may be used in which activated carbon is preferably used. The gas adsorbing material may be used upon being formed to have suitable dimensions, or used upon being classified into portions having certain meshes. Similarly, the granular formed heat accumulative agent has been formed to have certain dimensions, or otherwise may be used by pulverizing a formed heat accumulative agent having relative large dimensions.

It is preferable that each of the formed heat accumulative agent and the gas adsorbing material has a column-like shape and have diameters ranging from 1 to 3 mm and lengths ranging from 1 to 5 mm. Such column-like formed heat accumulative agent and gas adsorbing material are readily obtained by continuously extruding a raw material and then by cutting or breaking the extruded raw material. By using the column-like formed heat accumulative agent and gas adsorbing material in combination, separation of them upon time lapse can be further securely suppressed.

According to this embodiment, during gas adsorption and desorption of the gas adsorbing material, suppression of temperature rise due to adsorption of latent heat and suppression of temperature drop due to release of latent heat can be accomplished in such a manner as to make more uniform a temperature distribution inside the gas storage canister, thereby effectively improving a gas adsorption amount of the gas storage canister.

EXAMPLES

The embodiment of the present invention will be more readily understood with reference to the following Examples in comparison with Comparative Examples; however, these Examples are intended to illustrate the invention and are not to be construed to limit the scope of the invention.

Example 1-1

A 37% formaldehyde aqueous solution in an amount of 6.5 g and water in an amount of 10 g were added to 5 g of powdered melamine to form a mixture. The mixture was adjusted to have a pH of 8, and then heated to about 70° C. thereby obtaining a melamine-formaldehyde initial-stage condensation product.

A mixture solution was prepared by dissolving 80 g of n-eicosane serving as a phase changing material into 100 g of a sodium salt aqueous solution of stylene-maleic anhydride copolymer which solution had been adjusted to pH 4.5. This mixture solution was added to the above melamine-formaldehyde initial-stage condensation product while being vigorously stirred thereby making emulsification, followed by a pH adjustment to pH 9, thus accomplishing a micro-encapsulation to form micro-capsules dispersed in the solution. Thereafter, solvent of the solution in which the micro-capsules were dispersed was removed upon being dried thus obtaining powdered bodies or micro-capsules (heat accumulative agent) each of which was n-eicosane micro-encapsulated with a film or outer shell of melamine. N-eicosane had a phase change temperature (at which a phase change occurs) or melting point of 36° C. which was higher than the temperature of atmospheric air on the assumption that the atmospheric air temperature was 25° C. under a condition where the gas storage canister was used.

A carboxymethyl cellulose aqueous solution was added as a binder to the above obtained powdered heat accumulative agent and mixed with each other to form a mixture. The mixture was subjected to an extrusion forming so as to be formed into the column-like shape and dried, followed by being cut thereby to obtain a column-like formed heat accumulative agent (A) having a diameter of about 2 mm and a length ranging from 1 to 5 mm.

Additionally, wood-based formed activated carbon was prepared by mixing powdered wood-based activated carbon with a binder (bentonite or clay) and subjected to an extrusion forming similar that for the formed heat accumulative agent. The prepared formed activated carbon was column-like and had a diameter of about 2 mm and a length ranging from 1 to 5 mm.

A mixture prepared so that, for an average mix proportion, the mixture contains 20 wt % of the above-mentioned formed heat accumulative agent (A), and 80 wt % of formed activated carbon was packed as shown in FIG. 1 in a case 1 of nylon having a volume of 900 cc, to obtain a gas storage canister. Especially, at a left end portion of the case 1 in the drawing provided with a vapor flow inlet 4 and a vapor flow outlet 5, the formed heat accumulative agent (A) became 10 wt %, and the formed activated carbon 90 wt %. At a right end portion of the case 1 in the drawing provided with an atmosphere-opening port 6 (opened to atmospheric air), the formed heat accumulative agent (A) became 30 wt %, and formed activated carbon 70 wt %, in such a manner that, between the two end portions, the mix proportion of the formed heat accumulative agent (A) varied continuously. Therefore, at a central portion of the case in the longitudinal direction thereof, the formed heat accumulated agent (A) became 20 wt %, and formed activated carbon 80 wt %.

Such continuously varying mix proportion can be attained easily by packing the formed heat accumulative agent (A) and formed activated carbon in the case 1 while they are mixed with each other, and varying the supply rates of these two materials during the packing operation.

Example 1-2

Figure 2:
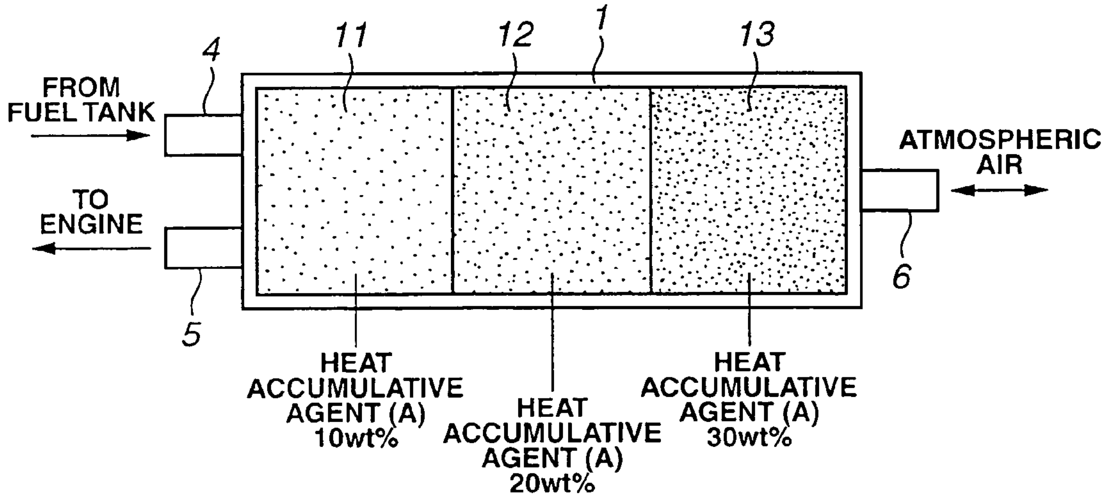
FIG. 2 is an explanatory view of the gas storage canister of Example 1-2 according to the first embodiment of the present invention.

The mix proportion of the same formed heat accumulative agent (A) and that of the formed activated carbon as were used in Example 1-1 were varied in a stepped manner so that the interior of the case 1 is partitioned into three regions in the direction of flow as shown in FIG. 2. A uniform mixture of 10 wt % of formed heat accumulative agent (A) and 90 wt % of formed activated carbon was packed in a first region 11 on the side of the vapor inflow port 4 and vapor outflow port 5, and a mixture of 20 wt % of formed heat accumulative agent (A) and 80 wt % of formed activated carbon was packed in a second region 12 in a central portion of the case. A uniform mixture of 30 wt % of formed heat accumulative agent and 70 wt % of formed activated carbon was packed in a third region 13 on the side of the atmosphere-opened port 6.

Comparative Example 1-1

The same formed columnar ligneous activated carbon only that was used in Examples 1-1 and 1-2 was packed in the same nylon case 1 as was used in Examples 1-1 and 1-2, to obtain a gas storage canister.

Comparative Example 1-2

A uniform mixture of 20 wt % of the same formed heat accumulative agent (A) and 80 wt % of the same formed activated carbon as were used in Examples 1-1 and 1-2 were was packed in the whole of the same nylon case 1 as was used in Examples 1-1 and 1-2, to obtain a gas storage canister.

Figure 3:
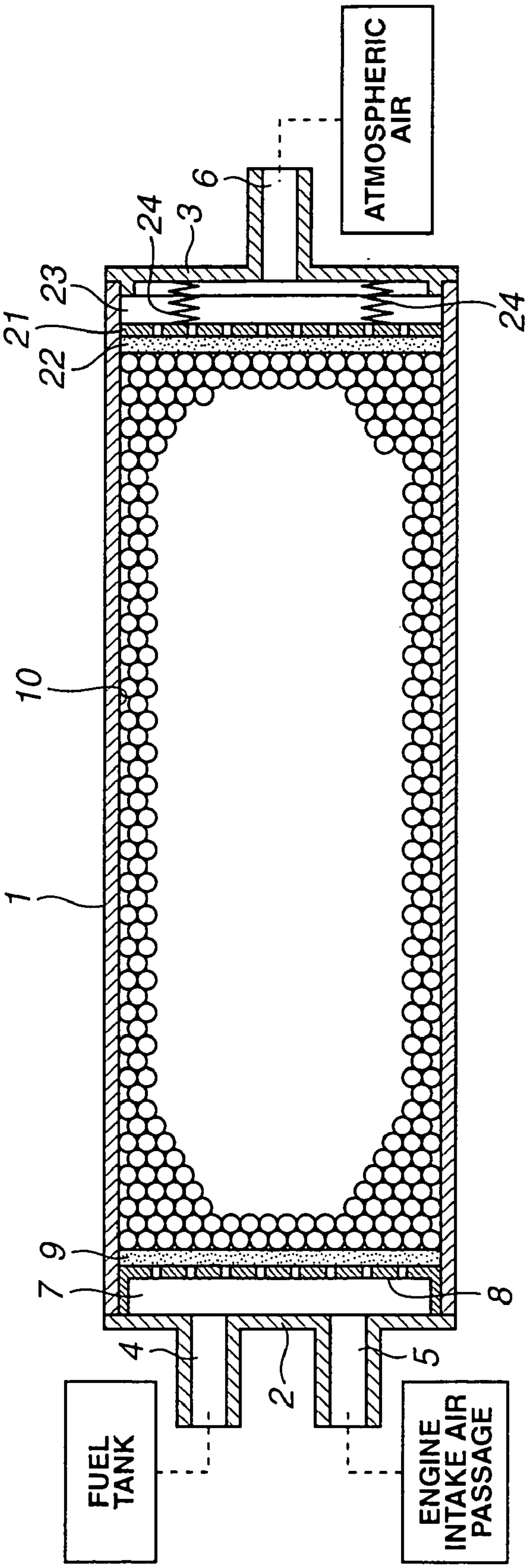
FIG. 3 is a cross-sectional view showing a concrete construction of the gas storage canister according to the first embodiment of the present invention.

FIG. 3 shows a more concrete construction of these canisters. The case 1 is formed cylindrically, one end of which is closed with an end wall 2 on the side of an inflow/outflow portion, and the other end of which is closed with an end wall 3 on the side of an atmosphere-opened port. On the end wall 2 on the side of the inflow/outflow portion, a vapor inflow port 4 connected to a fuel tank is formed in parallel with a vapor outflow port 5 connected to an engine suction passage. The end wall 3 on the side of the atmosphere-opened port is provided with a port 6 opened to the atmosphere. The end wall 2 on the side of the inflow/outflow portion is provided on the inner side thereof with a porous plate 8 having a flange on a circumference thereof and a sheet type filter member 9 made of a nonwoven fabric and the like which are laminated on each other so that a space 7 is left. The end wall 3 on the side of the atmosphere-opened port is similarly provided on the inner side thereof with a flat porous plate 21 and a sheet type filter member 22 arranged with a clearance constituting a space 23 left. A space between the two sheet type filter members 9, 22 is a space 10 for housing the gas adsorbing material packed therein. Between the end wall 3 on the side of the atmosphere opening port and porous plate 21, a plurality of compression coiled springs 24 are provided, and the gas adsorbing material packed in the gas adsorbing material housing space 10 is thereby given a suitable level of pressing force.

In Example 1-1, the mix proportion of the formed activated carbon and formed heat accumulative agent (A) which are packed in the gas adsorbing material housing space 10 varies continuously as mentioned above. In Example 1-2, the gas adsorbing material housing space 10 is partitioned into a first region 11 to a third region 13 as mentioned above, in each of which are packed with the respective mix proportions of formed heat accumulative agent and formed activated carbon. Physical partition walls are not necessarily needed between the regions as shown in FIG. 3.

Figure 4:
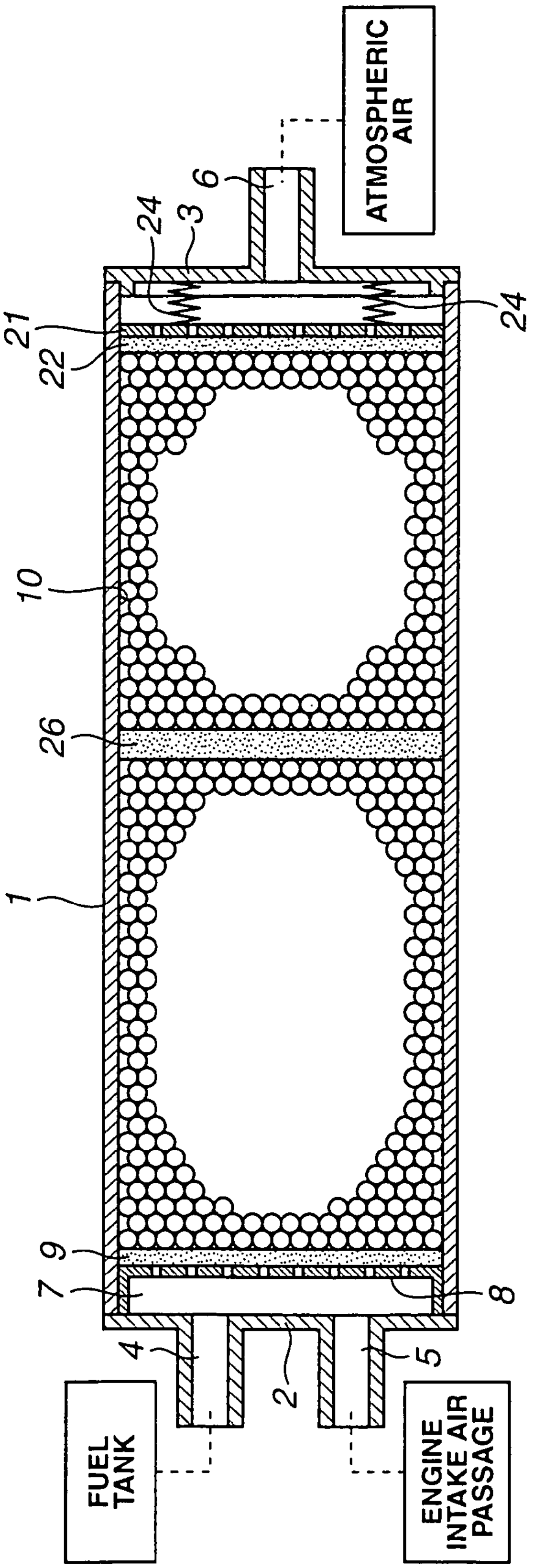
FIG. 4 is a cross-sectional view showing another concrete construction of the gas storage canister according to the first embodiment of the present invention.

FIG. 4 shows a different concrete example of the above-mentioned canisters. In this structural example, physical partition walls 26 are provided among a plurality of regions in which the mix proportions of the materials differ from each other in a stepped manner so that the formed heat accumulative agent in one region is not mixed with that in another region. Each of such partition walls 26 is formed of circular filter members made of nonwoven fabric and the like having a gas permeability, and provided between adjacent regions. These partition walls 26 are not fixed specially to the case 1. FIG. 4 illustrates a structure partitioned into two regions by the partition wall 26. It is also possible to partition the interior of the case into three regions as in Example 1-2, or into not smaller than three regions.

Figure 5:
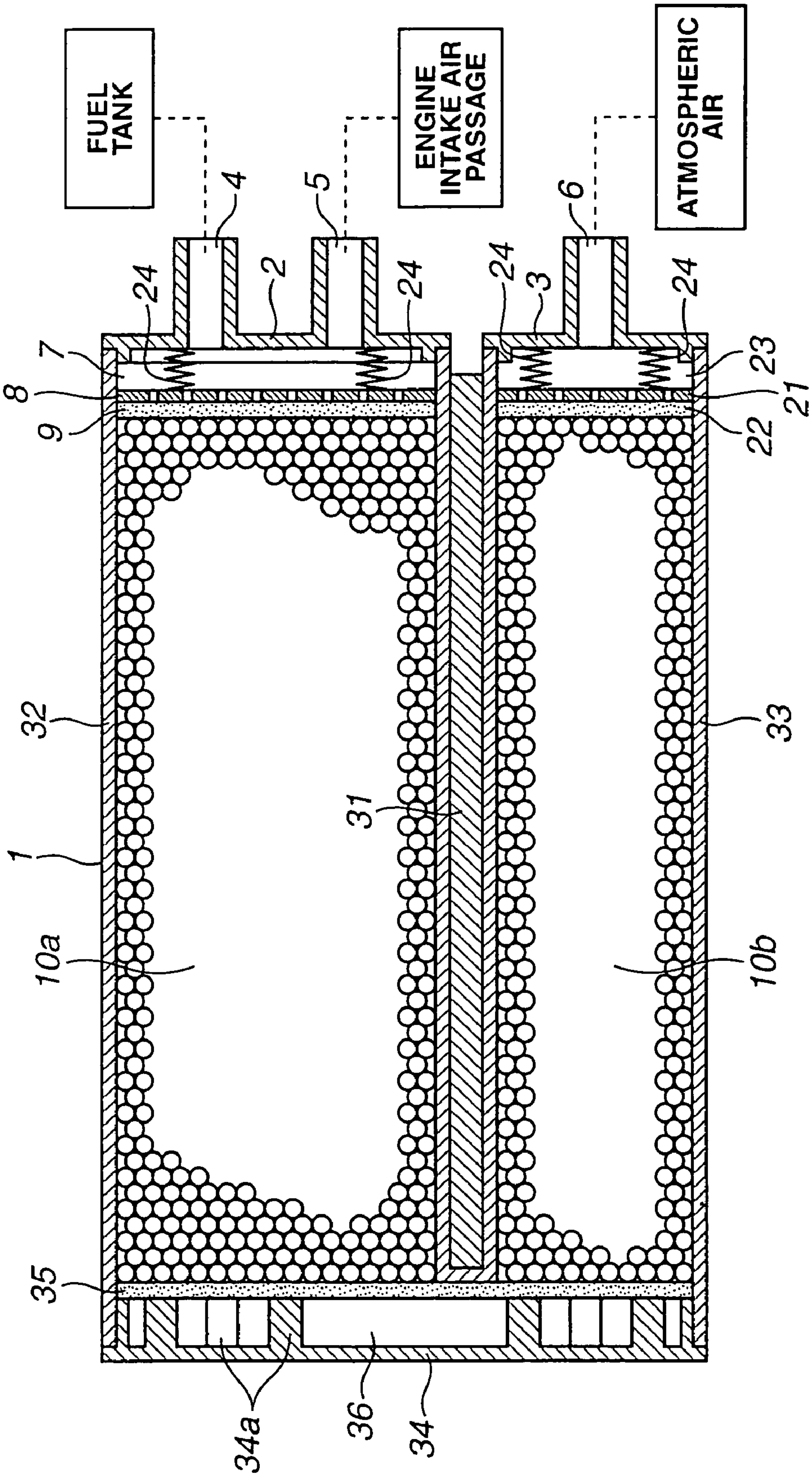
FIG. 5 is a cross-sectional view showing a further concrete construction of the gas storage canister according to the first embodiment of the present invention.

The present invention can also be applied in the same manner as shown in FIG. 5 to a gas storage canister having a U-shaped flow passage. Namely, in this structural example, the case 1 as a whole is formed to a rectangular solid, which is divided by an intermediate partition wall 31 into a first case member 32 in an upper portion of the drawing, and a second case member 33 in a lower portion thereof. The first and second case members 32, 33 are both formed to rectangular solids, and one end of the first case member 32 is closed with an end wall 2 on the side of the inflow/outflow portion, one end of the second case member 33 being closed with an end wall 3 on the side of an atmosphere-opened port. The end wall 2 on the side of the inflow/outflow portion is provided with a vapor inflow port 4 connected to a fuel tank and a vapor outflow port 5 connected to an engine suction passage so that the ports are formed in parallel with each other. In the end wall 3 on the atmosphere-opened end, an atmosphere-opened port 6 is formed. In short, these three are provided on the same surface of the case 1. The end wall 2 on the side of the inflow/outflow portion is provided on the inner side thereof with a porous plate 8 and a sheet type filter member 9 which are arranged in a laminated manner with a clearance constituting a space 7 left. The end wall 3 on the side of the atmosphere-opened port is provided similarly on the inner side thereof with a flat porous plate 21 and a sheet type filter member 22, which are arranged in a laminated manner with a clearance constituting a space 23 left.

On the other end of the case 1, a communication end wall 34 is fixed, and a filter member 35 made of a nonwoven fabric and the like is provided so as to cover an opened port surface of the other ends of the first and second case members 32, 33. This filter member 35 is supported on a plurality of projections 34*a* formed on the communication end wall 34. As a result, a space 36 constituting a communication passage 36, which communicates the first case member 32 and second case member 33 with each other, is formed between the communication end wall 34 and filter member 35. Thus, the first gas adsorbing material housing space 10*a* is formed which is held between the two filter members 3 5, 9 in the first case member 32, and also a second gas adsorbing material housing space 10*b* is formed which is held between the two filter members 35, 22 in the second case member 33. These two gas adsorbing material housing spaces 10*a*, 10*b* are connected substantially in series as flow passages. Both between the end wall 3 on the side of the atmosphere-opened port and porous plate 21, and, between the end wall 2 on the side of the inflow/outflow portion and porous plate 8, a plurality of compression coiled springs 24 are provided respectively.

Even in such a U-shaped canister, the substance thereof does not differ at all as compared with that of the linear canister shown in FIG. 3 and FIG. 4. The distribution of the heat accumulative agent in Example 1-1 or Example 1-2 can be applied to the U-shaped canister in the same manner.

Figure 6:
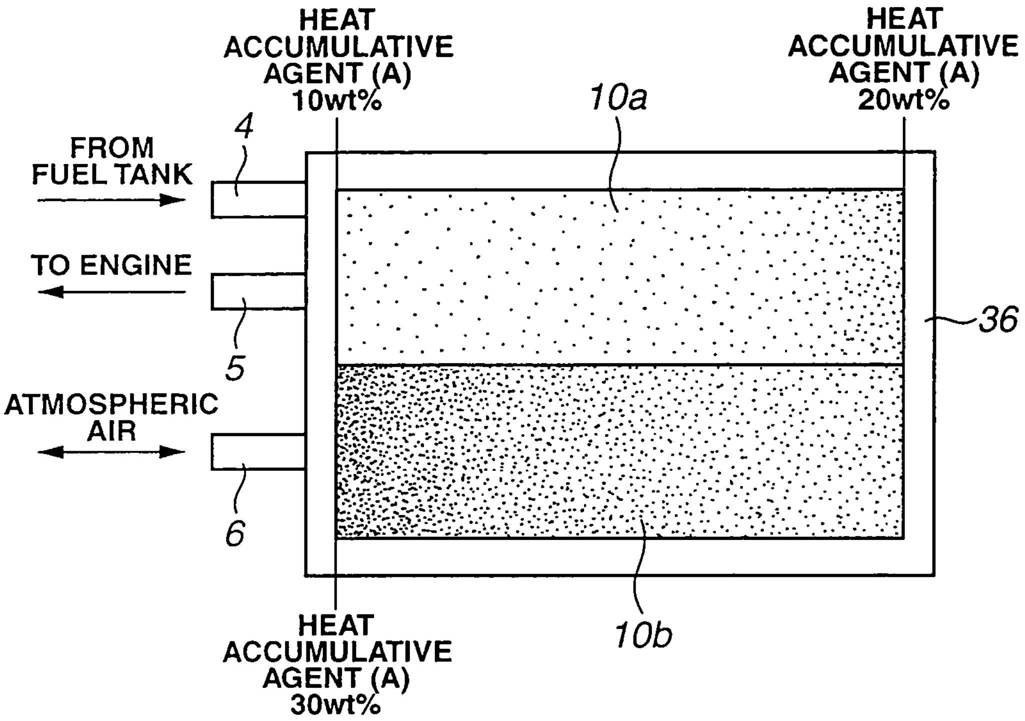
FIG. 6 is an explanatory view of a U-shaped gas storage canister of Example 1-1 according to the first embodiment of the present invention.
Figure 7:
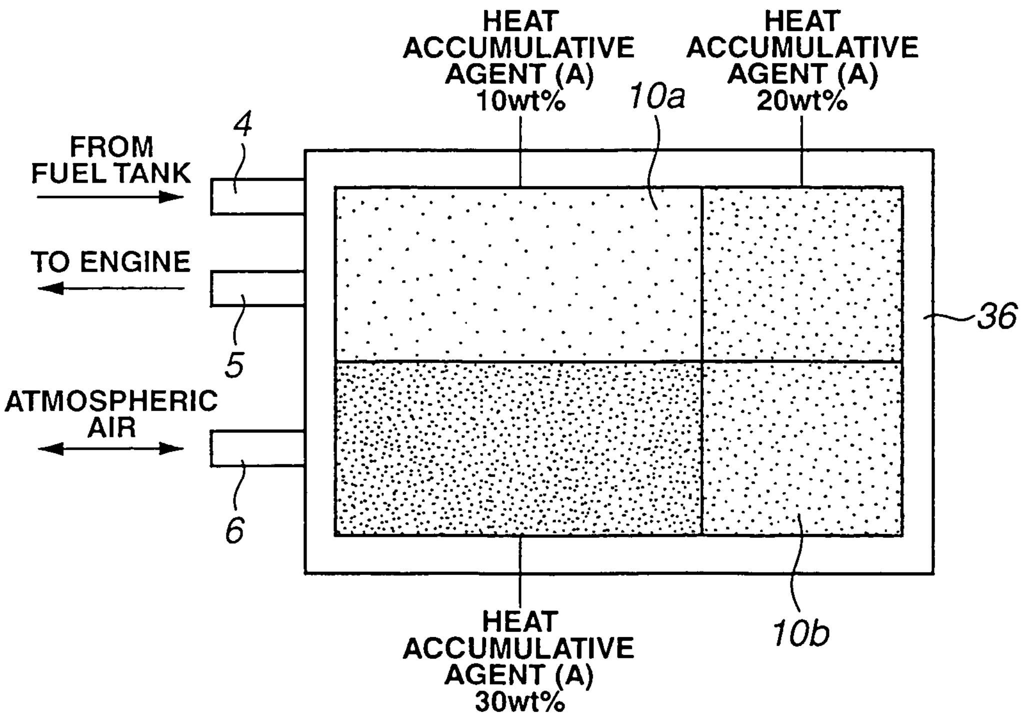
FIG. 7 is an explanatory drawing of a U-shaped gas storage canister of Example 1-2 according to the first embodiment of the present invention.

FIG. 6 shows an example of the U-shaped canister to which the distribution of mix proportion in Example 1-1 is applied. Also, FIG. 7 shows an example of the U-shaped canister to which the distribution of the mix proportion in Example 1-2 is applied thereto.

Figure 8:
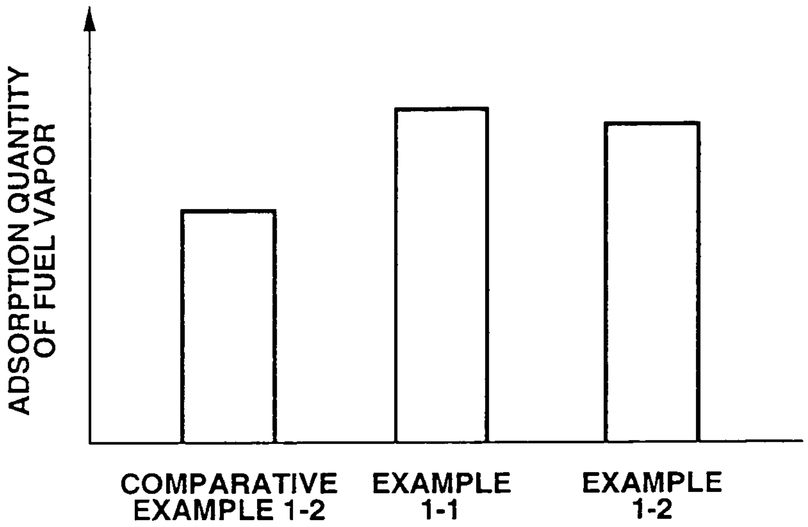
FIG. 8 is a characteristic diagram showing the quantities or amounts of gas adsorbed in the gas storage canisters of Examples and Comparative Example.

The quantity or amount of the gas adsorbed to the canister was measured by using each Example and Comparative Example 1-2, to obtain the results shown in FIG. 8.

In comparison with Comparative Example 1-2, in which a formed heat accumulative agent (A) was mixed uniformly with formed activated carbon, Examples 1-1 and 1-2, in which formed heat accumulative agent (A) is mixed with formed activated carbon with optimum distribution, attained a great improvement in the quantity of adsorbed gas in spite of the fact that the quantity used of the heat accumulative agent (A) was equal to that in Comparative Example 1-2.

The method of measuring the quantity of adsorbed gas is as follows. First, a gas storage canister ("testing canister") to be tested is connected to a fuel container 53 in a test circuit 51 shown in FIG. 9, under an atmospheric temperature of 25° C., and a predetermined flow rate (1.0 L/min) of the air is blown into a liquid fuel (gasoline) 53*a* in the fuel container 53 through inlet and outlet 52*a*, 52*b* of an air flow meter 52 to cause bubbles to occur, and the fuel vapor 53*b* thereof to be adsorbed to the canister. The leakage (break through) from the side of the atmosphere-opened port 6 of the canister is measured with a fuel leak detecting device 54, and the fuel vapor is adsorbed to the canister until the quantity of leakage becomes 2.0 g. The testing canister is then inserted into a test circuit 61 shown in FIG. 10, in which the air is supplied from the side of the atmosphere-opened port 6 to the canister by using a vacuum pump 62 and an air flow meter 63, to carry out the desorption of the gasoline vapor. The above gasoline vapor adsorption and desorption operations are repeated six times, and the quantities of adsorption of the gasoline vapor measured in the last three times were averaged, the average was determined as the quantity of adsorption of each canister.

Figure 11:
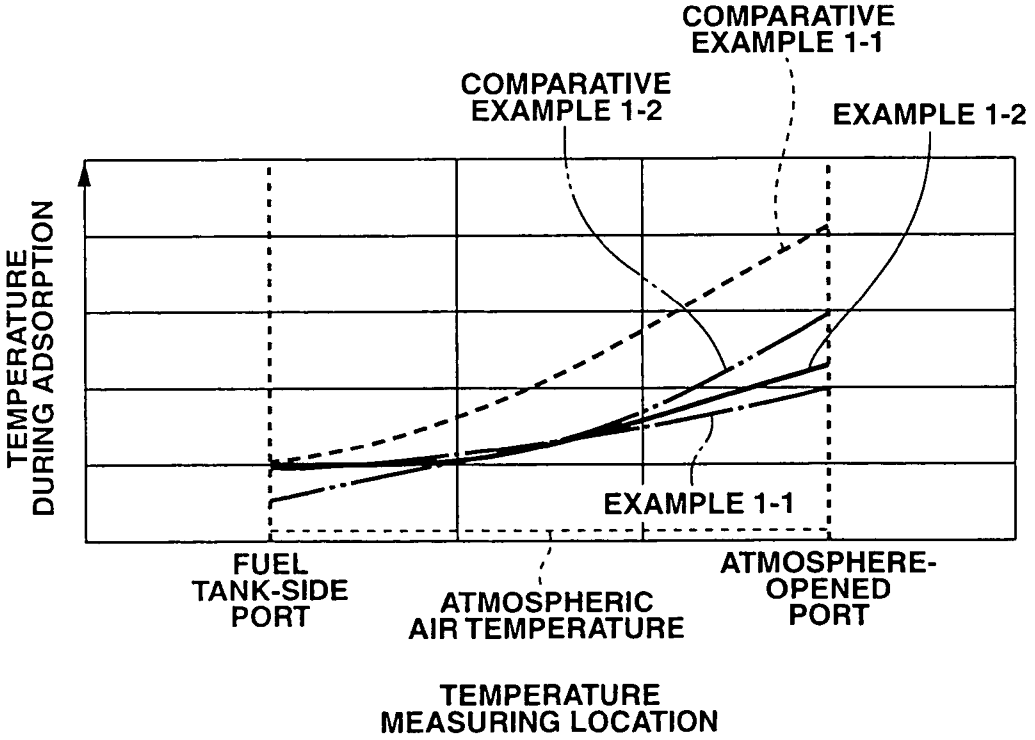
FIG. 11 is a characteristic diagram showing the temperature distribution at the adsorption finishing time in connection with the gas storage canisters of Examples and Comparative Examples.

FIG. 11 shows the results of measurement of the temperature distribution, especially, the temperature distribution at the adsorption finishing time in each portion of the interior of the canister in Examples 1-1 and 1-2 and Comparative Examples 1-1 and 1-2. As seen in Comparative Example 1-1 using formed activated carbon only, the temperature in the canister has basically a temperature rise higher than the atmospheric temperature (25° C.) at the adsorption time, and reaches a higher temperature at the portion of the canister which is closer to the atmosphere-opened port 6. The phase changing material for the formed heat accumulative agent (A) having a melting point of 36° C. has a solid phase under the atmospheric temperature, and, when the temperature rises to a level not lower than the melting point, the phase changing material adsorbs the latent heat and changes into a liquid phase. In Examples 1-1 and 1-2 and Comparative Example 1-2 which contain this formed heat accumulative agent (A), the temperature is held down to a level lower than that that in Comparative Example 1-1. In Examples 1-1 and 1-2, the quantity of heat capable of being adsorbed by the formed heat accumulative agent (A) in the portion on the side of the atmosphere-opened port 6 in which a temperature rise is most noticeable becomes larger than that in Comparative Example 1-2. Therefore, the temperature in the portion on the side of the atmosphere-opened port 6 can be held down to a level lower than that of the corresponding temperature in Comparative Example 1-2, and this enables the temperature of the portion at the side of the atmosphere-opened port 6 to be held down to a level lower than that of the corresponding temperature in Comparative Example 1-2. Therefore, a decrease in the adsorption performance of the gas adsorbing material at the portion on the side of the atmosphere-opened port 6 can be suppressed. In view of the portion on the side of the vapor inflow port 4 and the portion on the side of the vapor outflow port 5, the temperatures in Examples 1-1 and 1-2 become higher than that in Comparative Example 1-2 since the quantity of the formed heat accumulative agent (A) in these Examples is smaller than that thereof in Comparative Example 1-2 but the absolute temperature is lower than that in the portion on the side of the atmosphere-opened port 6. Therefore, a bad influence upon the adsorption quantity in the canister as a whole is relatively small, so that the adsorption quantity in the canister as a whole is necessarily improved as mentioned above more than that in Comparative Example 1-2.

Example 1-3

Figure 12:
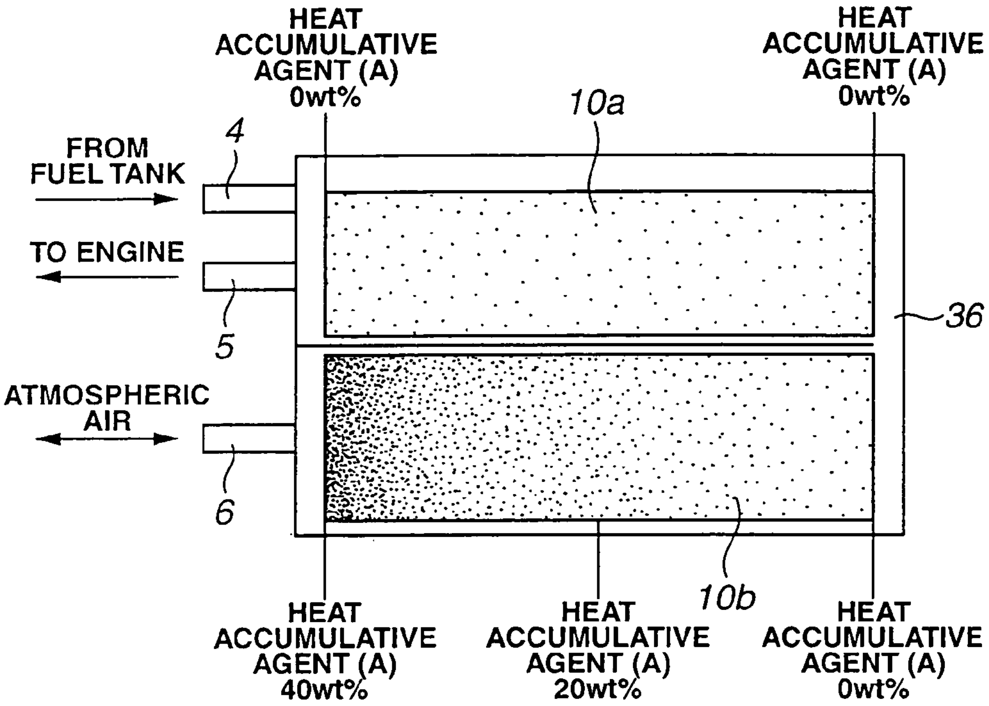
FIG. 12 is an explanatory drawing of the gas storage canister of Example 1-3 according to the first embodiment of the present invention.

As shown in FIG. 12, formed activated carbon only was packed in a gas adsorbing material housing space 10*a* in a U-shaped canister, and a mixture of formed heat accumulative agent (A) and formed activated carbon was then packed in a second adsorbing material housing space 10*b*. Especially, at the end portion of the second adsorbing material housing space 10*b* at the side of a communication passage (space 36) which communicates with the first gas adsorbing material housing space 10*b*, formed heat accumulative agent (A) became 0 wt %, and formed activated carbon 100 wt %; at an end portion on the side of the atmosphere-opened port 6, formed heat accumulative agent (A) became 40 wt %; and formed activated carbon 60 wt % so that the mix proportion of the formed heat accumulative agent (A) at the two end portions varied continuously. Therefore, an average mix proportion in the canister as a whole became 10 wt % of formed heat accumulative agent (A) and 90 wt % of formed activated carbon. The formed activated carbon in the first gas adsorbing material housing space 10*a* functions as a pretreatment layer when the deterioration of the activated carbon due to the use of, for example, inferior fuel occurs noticeably. In this case, formed heat accumulative agent (A) decreases correspondingly. It is, of course, possible to form not only the U-shaped canister but also the above-mentioned linear canister.

Example 1-4

A columnar formed heat accumulative agent (B) was obtained by using n-hexadecane as a phase changing material by the same method as was used in Example 1-1. The phase change temperature, i.e., a melting point of the n-hexadecane is 16° C., which is lower than the atmospheric temperature (25° C.) assumed under the conditions of use of the canister.

Figure 13:
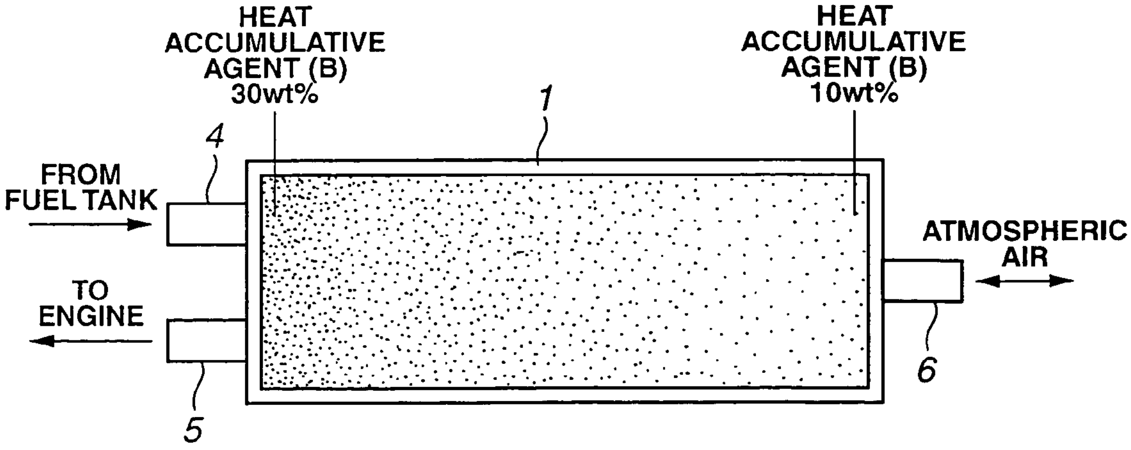
FIG. 13 is an explanatory view of the gas storage canister of Example 4 according to the first embodiment of the present invention.

A mixture having as mix proportion of 20 wt % of the formed heat accumulative agent (B) and 80 wt % of formed activated carbon was packed in a nylon case 1 as shown in FIG. 13, to obtain a gas storage canister. Especially, in an end portion shown on the left side of the drawing, which is provided with a vapor inflow port 4 and vapor outflow port 5, the mix proportion of the formed heat accumulative agent (B) was 30 wt % and that of the formed activated carbon 70 wt %, and, in an end portion shown on the right side of the drawing, which is provided with the atmosphere-opened port 6, the mix proportion of the formed heat accumulative agent (B) was 10 wt %, and that of the formed activated carbon 90 wt % so that the mix proportions of the formed heat accumulative agent (B) between the two end portions varied continuously. Accordingly, in a longitudinally central portion of the case 1, the formed heat accumulative agent (B) became 20 wt %, and the formed activated carbon 80 wt %. In short, the direction in which the formed heat accumulative agent increases and decreases in Example 1-4 is reversed in comparison with that in Example 1-1.

Figure 14:
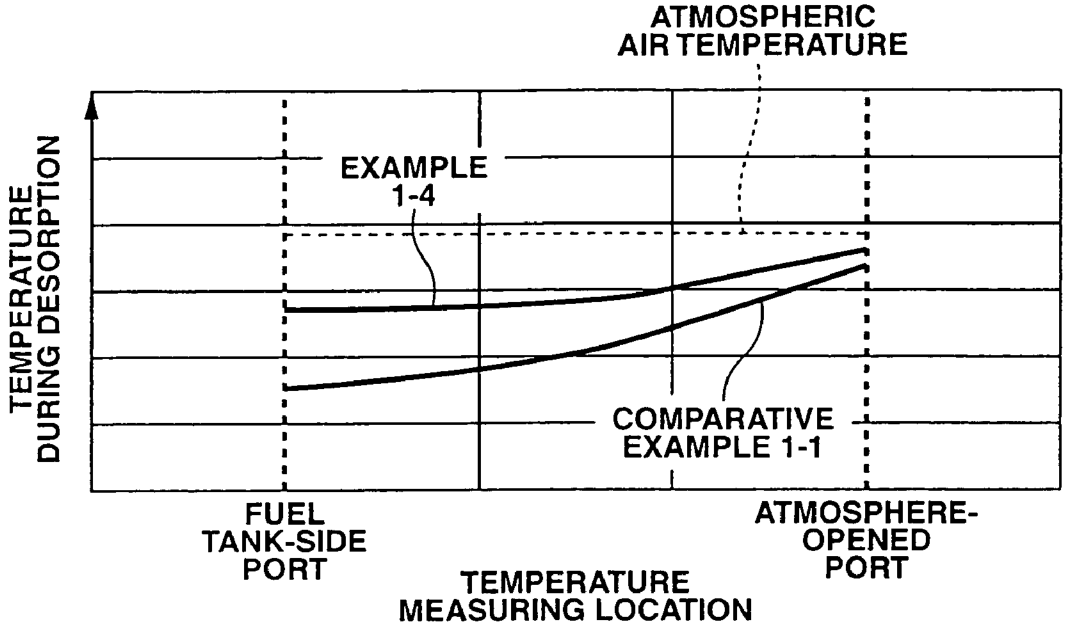
FIG. 14 is a characteristic diagram showing the temperature distribution at the desorption finishing time in connection with the gas storage canisters of Example and Comparative Example.

FIG. 14 shows the results of measurements of the temperature distribution in each portion of the interior of the canister, especially, the results of measurements of temperature distribution at the desorption finishing time concerning Example 1-4 and Comparative Example 1-1. In the desorption the temperature in the interior of the canister basically lowers as seen in Comparative Example 1-1 using formed activated carbon only to a level lower than the atmospheric temperature (25° C.), and the canister encounters a lower temperature at the portion thereof which is closer to the vapor outflow port 5. When the phase changing material for the formed heat accumulative agent (B) the melting point of which is 16° C. is in a liquid phase under the atmospheric temperature, and, when the temperature lowers to a level not higher than the melting point, the latent heat is discharged, the phase changing material changes into a solid phase. Therefore, Example 1-4 containing this formed heat accumulative agent (B) retains the temperature higher than that in Comparative Example 1-1 owing to the latent heat discharging effect. In Example 1-4, the mix proportion of the formed heat accumulative agent (B) is high in the portion on the side of the vapor outflow port 5 in which a temperature drop is most noticeable, so that the temperature drop in this portion can be held down reliably. This enables the desorption operation in the portion on the side of the vapor outflow port 5 to be carried out sufficiently, and a decrease in the gas adsorption performance of this portion to be held down.

Example 1-5

Figure 15:
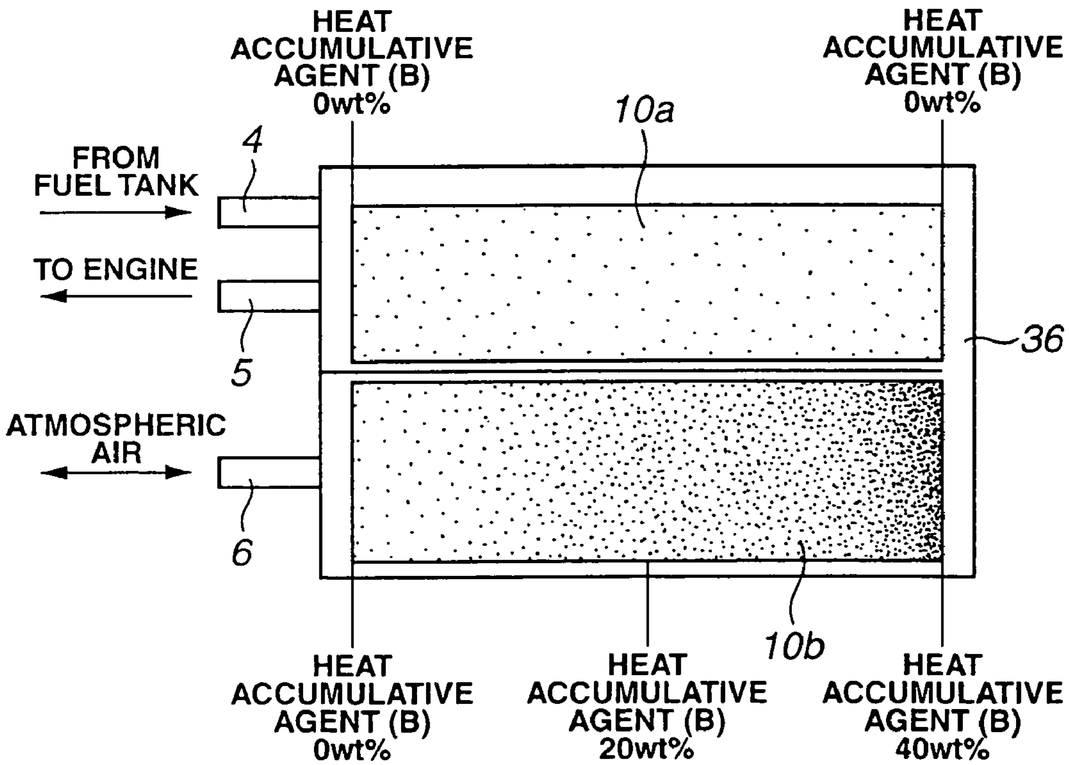
FIG. 15 is an explanatory view of the gas storage canister of Example 1-5 according to the first embodiment of the present invention.

As shown in FIG. 15, formed activated carbon only was packed in a first gas adsorbing material housing space 10*a* in a U-shaped canister, and a mixture of formed heat accumulative agent (B) and formed activated carbon in a second gas adsorbing material housing space 10*b*. Especially, in the second gas adsorbing material housing space 10*b* which is on the side of a communication passage (space 36) communicating with the first gas adsorbing material housing space 10*a*, the formed heat accumulative agent (B) was 40 wt % and formed activated carbon 60 wt %, and, in the end portion thereof which is on the side of the atmosphere-opened port 6, the formed heat accumulative agent (B) became 0 wt %, and formed activated carbon 100 wt %. Between these two end portions, the mix proportion of the formed heat accumulative agent (B) is set so that the mix proportion varied continuously. Therefore, the average mix proportions in the canister as a whole were 10 wt % of the formed heat accumulative agent (B), and 90 wt % of formed activated carbon. When in this Example 1-5 the formed activated carbon in the first gas adsorbing material housing space 10*a* is deteriorated greatly due to, for example, the use of inferior fuel, the formed activated carbon functions as a pretreatment layer in the same manner as in Example 1-3. It is, of course, possible to form the U-shaped canister but also the above-mentioned linear canister.

The Examples have been described as using n-eicosane (melting point: 36° C.) and n-hexadecane (melting point: 16° C.) as phase changing materials on the assumption that the atmospheric temperature in a condition where the canister is used is 25° C. Needless to say, there are cases where the atmospheric temperature is higher or conversely low depending upon a site in which the canister is disposed in an automobile. Therefore, the phase changing materials are suitably selected on the basis of the assumed atmospheric temperature so that a phase change occurs during a gas adsorption operation or a desorption operation.

Next, a second embodiment of the present invention will be discussed.

In a gas storage canister according to this embodiment, a heat accumulative agent utilizing a phase changing material which causes the adsorption and discharge of latent heat to occur in accordance with the temperature variation is mixed with a gas adsorption material, and a mixture thus obtained is packed in a case. A vapor inflow/outflow portion is provided at one end with respect to the direction of a flow of the case, and, at the other end thereof, an atmosphere-opened port. Especially, not less than two kinds of heat accumulative agents of different phase changing temperatures are provided, and each heat accumulative agent exists in a one-sided manner in accordance with the position in the direction of flow between the portion on the side of the inflow/outflow portion toward the portion on the side of the atmosphere-opened port.

In short, a plurality of kinds of heat accumulative agents of different phase changing temperatures are used suitably with the temperature distribution of the canister at the vapor adsorption or desorption time taken into consideration. The plural kinds of heat accumulative agents may coexist in a mixed state in each portion of the canister, or only one kind of heat accumulative agents may exist separately in different portions of the canister.

According to this embodiment, it is preferable that a heat accumulative agent of a relatively high phase changing temperature exists more largely in the portion which is on the side of the atmosphere-opened port.

In short, the temperature of the portion on the side of the atmosphere-opened port generally rises highest during the gas adsorption time. In the case of a heat accumulative agent utilizing latent heat, in the temperature condition prior to the adsorption time, the heat accumulative agent is in the prior phase change (for example, solid phase). Due to a temperature rise caused by the gas adsorption operation, the phase has to be changed (for example, to liquid phase), so that, among the plural kinds of heat accumulative agents, a heat accumulative agent having a relatively higher phase changing temperature becomes suitable to be provided in the portion which is on the side of the atmosphere-opened port. Conversely, at the gas desorption time, the temperature of the portion which is on the side of the inflow/outflow portion decreases most. Therefore, a heat accumulative agent of a relatively low phase changing temperature among a plurality of kinds of heat accumulative agents is suitably provided in the portion on the side of the inflow/outflow portion so that the phase change (for example, from a liquid phase to a solid phase) occurs due to the temperature drop caused by the gas desorption operation.

Owing to the provision of this heat accumulative agent, the temperature of each portion of the canister at the adsorption time or desorption time comes closer to a level in more uniform temperature distribution.

In one mode of this embodiment of the present invention, the interior of the case is partitioned into a plurality of regions in the direction of the flow, and heat accumulative agents of different phase changing temperatures are used in the respective regions. The interior of the case may also be partitioned into not less than three regions so that heat accumulative agents of different phase changing temperatures are used therein. The regions may include a region housing therein only a gas adsorbing material that is not mixed with a heat accumulative agent.

It is also possible to partition the interior of the case into a plurality of regions so that the mix proportions of a plurality of kinds of heat accumulative agents of different phase changing temperatures are rendered different in the respective regions.

The interior of the case may be partitioned physically by gas permeable partition walls, or may be divided into a plurality of regions without providing physical partition walls.

In one mode of this embodiment of the present invention, the interior of the case is not partitioned clearly, and the mix proportions of a plurality of different phase changing temperatures vary continuously in accordance with the positions in the direction of the flow.

It is desirable that the phase changing temperature of the heat accumulative agent be selectively determined with the atmospheric temperature assumed under the condition of use of the canister taken into consideration.

This embodiment is preferably so arranged that a heat accumulative agent of which the phase changing temperature is higher than the atmospheric temperature under the condition of use of the canister exists more largely in the portion on the side of the atmosphere-opened port, and so that a heat accumulative agent of which the phase changing temperature is lower than the mentioned atmospheric temperature exists more largely in the portion on the side of the inflow/outflow portion.

Accordingly, when the canister the temperature of which was in the vicinity of the atmospheric temperature increases due to the adsorption of vapor to exceed the former phase changing temperature of the heat accumulative agent, the adsorption of latent heat is carried out in accordance with the phase change, so that a temperature rise of the portion on the side of the atmosphere-opened port which is liable to have a high temperature is reliably held down. Conversely, when the canister the temperature of which is in the vicinity of the atmospheric temperature encounters a temperature drop due to the desorption of a gas to cause the temperature to become lower than the latter phase changing temperature of the heat accumulative agent, the discharge of the latent heat in accordance with the phase change, so that a temperature drop of the portion on the side of the inflow/outflow portion which is liable to have a low temperature is reliably held down.

It will be understood that the heat accumulative agent and the gas adsorbing material used in this embodiment are the same as those used in the first embodiment.

As will be appreciated from the above, according to this embodiment, during gas adsorption and desorption of the gas adsorbing material, suppression of temperature rise due to adsorption of latent heat and suppression of temperature drop due to release of latent heat can be accomplished in such a manner as to make more uniform a temperature distribution inside the gas storage canister, thereby effectively improving a gas adsorption amount of the gas storage canister.

EXAMPLES

The embodiment of the present invention will be more readily understood with reference to the following Examples in comparison with Comparative Examples; however, these Examples are intended to illustrate the invention and are not to be construed to limit the scope of the invention.

Example 2-1

A 37% formaldehyde aqueous solution in an amount of 6.5 g and water in an amount of 10 g were added to 5 g of powdered melamine to form a mixture. The mixture was adjusted to have a pH of 8, and then heated to about 70° C. thereby obtaining a melamine-formaldehyde initial-stage condensation product.

A mixture solution was prepared by dissolving 80 g of n-eicosane serving as a phase changing material into 100 g of a sodium salt aqueous solution of stylene-maleic anhydride copolymer which solution had been adjusted to pH 4.5. This mixture solution was added to the above melamine-formaldehyde initial-stage condensation product while being vigorously stirred thereby making emulsification, followed by a pH adjustment to pH 9, thus accomplishing a micro-encapsulation to form micro-capsules dispersed in the solution. Thereafter, solvent of the solution in which the micro-capsules were dispersed was removed upon being dried thus obtaining powdered bodies or micro-capsules (heat accumulative agent) each of which was n-eicosane micro-encapsulated with a film or outer shell of melamine. N-eicosane had a phase change temperature (at which a phase change occurs) or melting point of 36° C. which was higher than the temperature of atmospheric air on the assumption that the atmospheric air temperature was 25° C. under a condition where the gas storage canister was used.

A carboxymethyl cellulose aqueous solution was added as a binder to the above obtained powdered heat accumulative agent and mixed with each other to form a mixture. The mixture was subjected to an extrusion forming so as to be formed into the column-like shape and dried, followed by being cut thereby to obtain a column-like formed heat accumulative agent (A) having a diameter of about 2 mm and a length ranging from 1 to 5 mm.

Additionally, the above procedure was repeated with the exception that n-hexadecane was used as the phase changing material in place of n-eicosane, thereby obtaining a column-like formed heat accumulative agent (B) having a diameter of about 2 mm and a length ranging from 1 to 5 mm. N-hexadecane had a phase change temperature (at which a phase change occurs) or melting point of 16° C. which was lower than the above atmospheric air temperature on the assumption that the atmospheric air temperature was 25° C. under a condition where the gas storage canister was used.

Further, wood-based formed activated carbon was prepared by mixing powdered wood-based activated carbon with a binder (bentonite or clay) and subjected to an extrusion forming similar that for the formed heat accumulative agent. The prepared formed activated carbon was column-like and had a diameter of about 2 mm and a length ranging from 1 to 5 mm.

Figure 16:
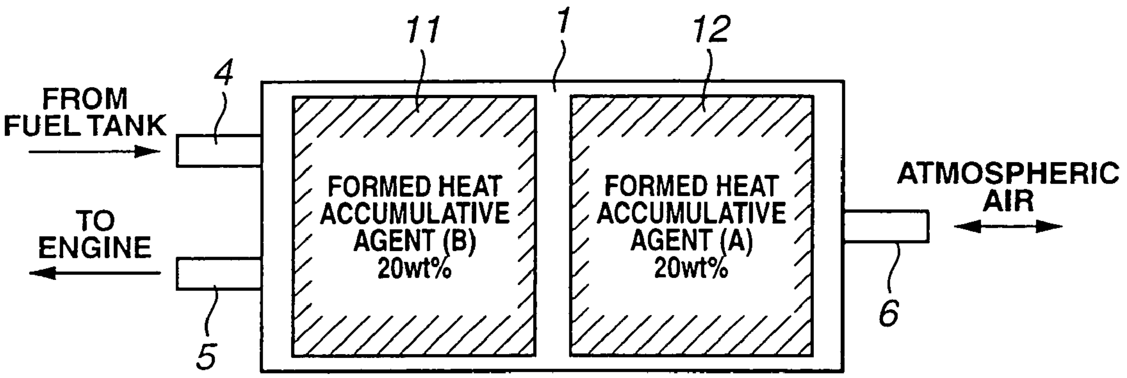
FIG. 16 is an explanatory view of the gas storage canister of Example 2-1 according to a second embodiment of the present invention.

A uniform mixture of 20 wt % of the formed heat accumulative agent (B) mentioned above and 80 wt % of the formed activated carbon mentioned above was packed in a first region 11 of a case 1 having a volume of 900 cc made of nylon as shown in FIG. 16, and a uniform mixture of 20 wt % of the formed heat accumulative agent (A) mentioned above and 80 wt % of the formed activated carbon mentioned above was packed in the second region 12 of the case 1 to obtain a gas storage canister.

Figure 17:
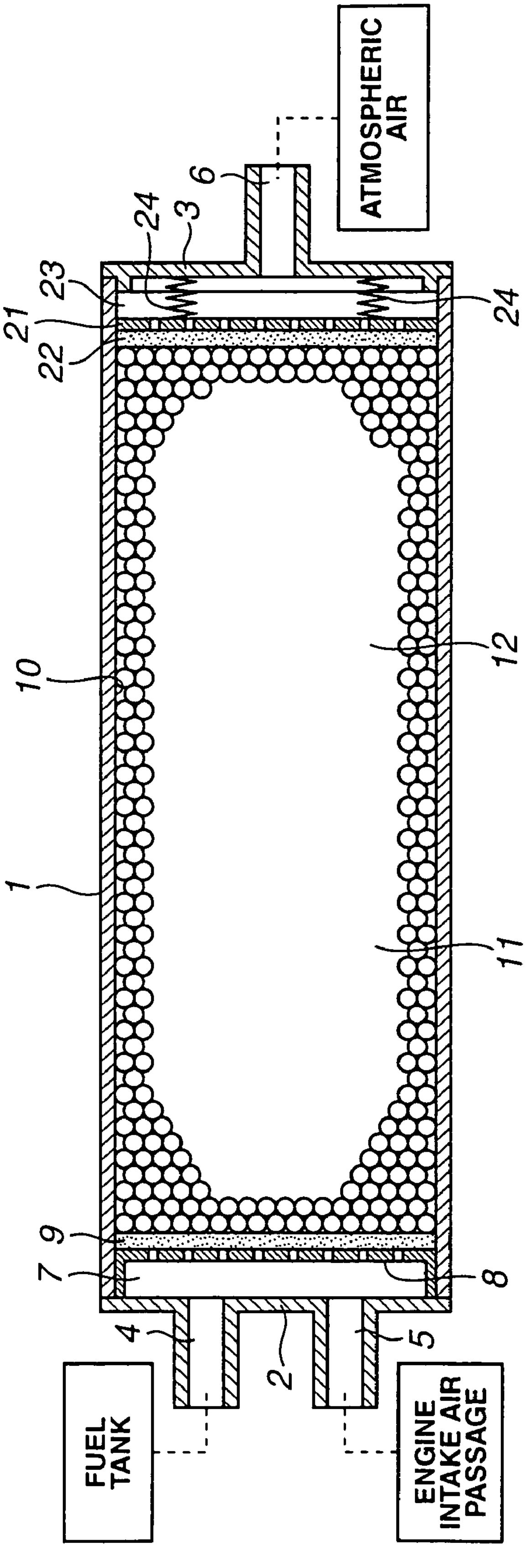
FIG. 17 is a cross-sectional view showing a concrete construction of the gas storage canister according to the second embodiment of the present invention.

FIG. 17 shows a more concrete construction of these canisters. The case 1 is formed cylindrically, one end of which is closed with an end wall 2 on the side of an inflow/outflow portion, and the other end of which is closed with an end wall 3 on the side of an atmosphere-opened port. On the end wall 2 on the side of the inflow/outflow portion, a vapor inflow port 4 connected to a fuel tank is formed in parallel with a vapor outflow port 5 connected to an engine suction passage. The end wall 3 on the side of the atmosphere-opened port is provided with a port 6 opened to the atmosphere. The end wall 2 on the side of the inflow/outflow portion is provided on the inner side thereof with a porous plate 8 having a flange on a circumference thereof and a sheet type filter member 9 made of a nonwoven fabric and the like which are laminated on each other so that a space 7 is left. The end wall 3 on the side of the atmosphere-opened port is similarly provided on the inner side thereof with a flat porous plate 21 and a sheet type filter member 22 arranged with a clearance constituting a space 23 left. A space between the two sheet type filter members 9, 22 is a space 10 for housing the gas adsorbing material packed therein. Between the end wall 3 on the side of the atmosphere opening port and porous plate 21, a plurality of compression coiled springs 24 are provided, and the gas adsorbing material packed in the gas adsorbing material housing space 10 is thereby given a suitable level of pressing force. As appreciated from the above, in Example 2-1, the space 10 is partitioned into the first region 11 at the side of the vapor inflow and outflow ports and the second region 12 at the atmosphere-opened port 6, so that the first and second regions 11, 12 are filled with different kinds of the formed head accumulative agents, respectively. However, in the arrangement of FIG. 17, no physical partition exists between the first and second regions 11, 12.

Example 2-2

Figure 18:
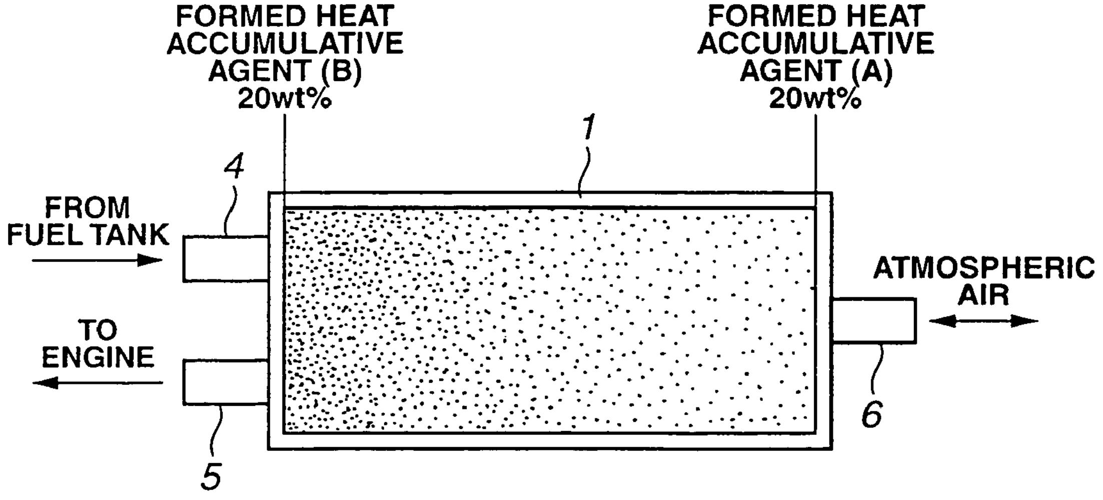
FIG. 18 is an explanatory view of the gas storage canister of Example 2-2 according to the second embodiment of the present invention.

The canister was formed as shown in FIG. 18, by using the formed heat accumulative agent (A), formed heat accumulative agent (B) and formed activated carbon so that the mix proportion of the formed heat accumulative agent (A) and formed heat accumulative agent (B) continuously varied from the side of an atmosphere-opened port 6 to a vapor inflow port 4 and vapor outflow port 5 in a case 1. The other portions of the canister are identical with the corresponding portions of Example 2-1.

Namely, the canister was formed so that, in each portion thereof, the formed heat accumulative agent (A) or (B) became 20 wt % with the formed activated carbon 80 wt %, and so that, in the end portion on the side of the atmosphere-opened port 6, the formed heat accumulative agent (A) was 20 wt % with the formed activated carbon 80 wt %. In the end portion on the side of the vapor inflow port 4 and vapor outflow port 5, the formed heat accumulative agent (B) was set to 20 wt % and the formed activated carbon 80 wt %. Accordingly, in the longitudinally central portion of the case, the formed heat accumulative agent (A) became 10 wt %, the formed heat accumulative agent (B) 10 wt % and formed activated carbon 80 wt %.

Such continuously varying distribution can be attained easily by packing in the case 1 formed heat accumulative agent (A), formed heat accumulative agent (B) and formed activated carbon while mixing these three with one another, and varying the supply rates of the formed heat accumulative agent (A) and formed heat accumulative agent (B) during the packing operation.

Comparative Example 2-1

The same columnar formed ligneous carbon only that was used in Examples 2-1 and 2-2 was packed in the same nylon case 1 as was used in Examples 2-1 and 2-2 to obtain a gas storage canister.

Comparative Example 2-2

A uniform mixture of 20 wt % of the same formed heat accumulative agent (A) as was used in Examples 2-1 and 2-2 and 80 wt % of the same formed activated carbon as was used in these Examples was packed in the same nylon case 1 as a whole as was used in Examples 2-1 and 2-2, to obtain a gas storage canister.

Figure 19:
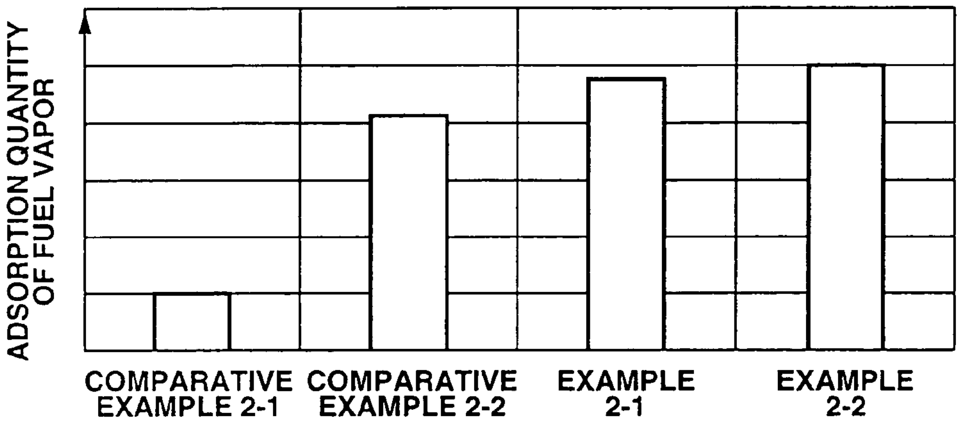
FIG. 19 is a characteristic diagram showing the quantity or amount of adsorption of a gas in connection with the gas storage canisters of Examples and Comparative Examples.

The gas adsorption quantity or amount of the canister was measured by using the above-mentioned Examples and Comparative Examples, to obtain the results shown in FIG. 19.

Even in Comparative Example 2-2 in which a single kind of formed heat accumulative agent utilizing a phase changing material was mixed, the quantity of adsorption of a gas was improved in comparison with Comparative Example 2-1 in which only formed activated carbon, a gas adsorbing material was used. In Examples 2-1 and 2-2, in which two kinds of the formed heat accumulative agents of different phase changing temperatures were mixed with each other with an optimum distribution, the quantity of adsorption of a gas was further improved.

Figure 9:
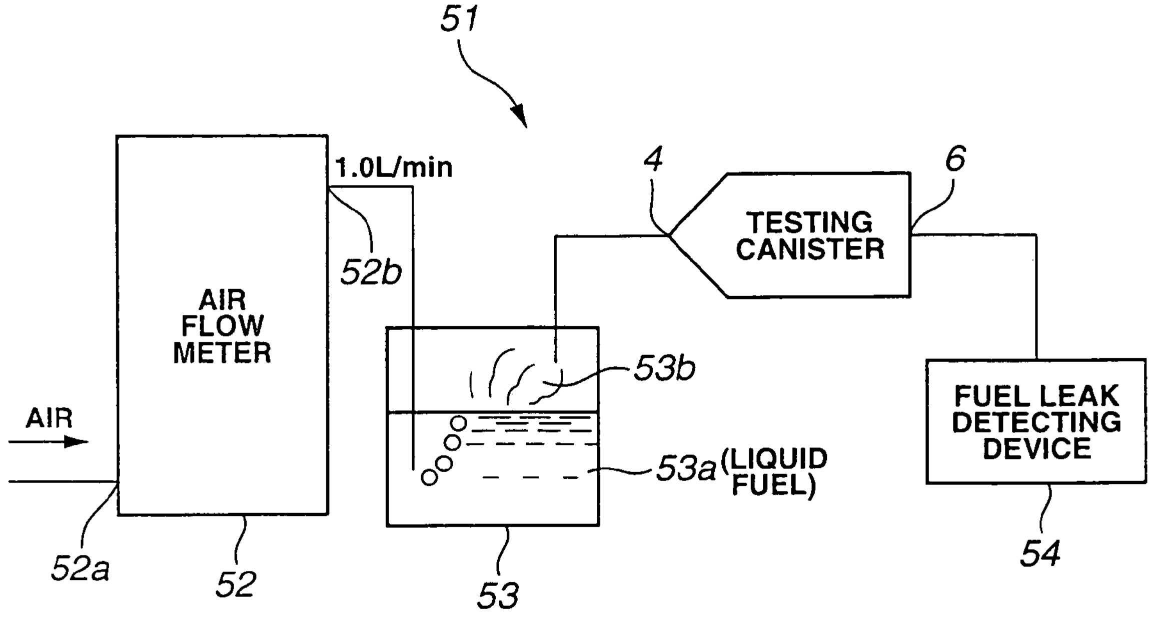
FIG. 9 is an explanatory view showing a test circuit to be used for measuring the quantities of gas adsorbed during a gas adsorption operation.
Figure 10:
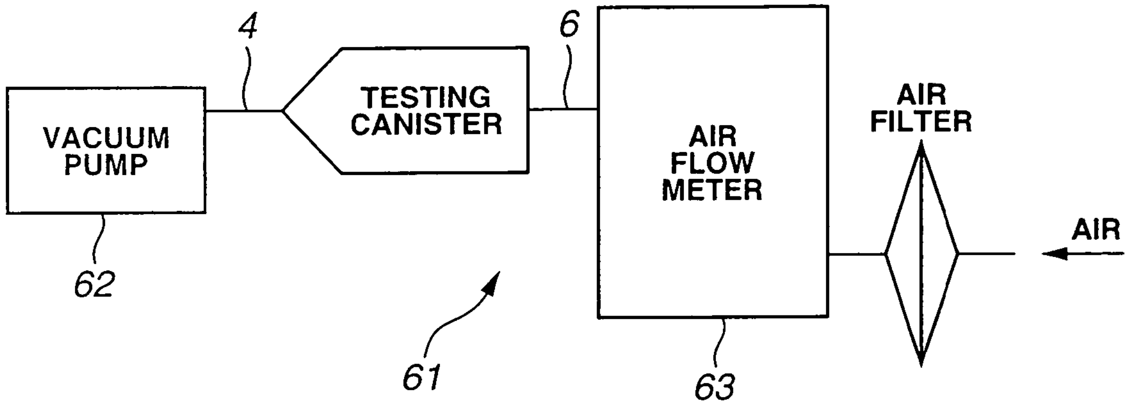
FIG. 10 is an explanatory view showing a test circuit to be used for measuring the quantities of gas desorbed during a gas desorption operation.

Here, it will be understood that the method of measuring the quantity of adsorbed gas is the same as that in the first embodiment using the test circuit 51 in FIG. 9 and the test circuit 61 in FIG. 10.

Figure 20:
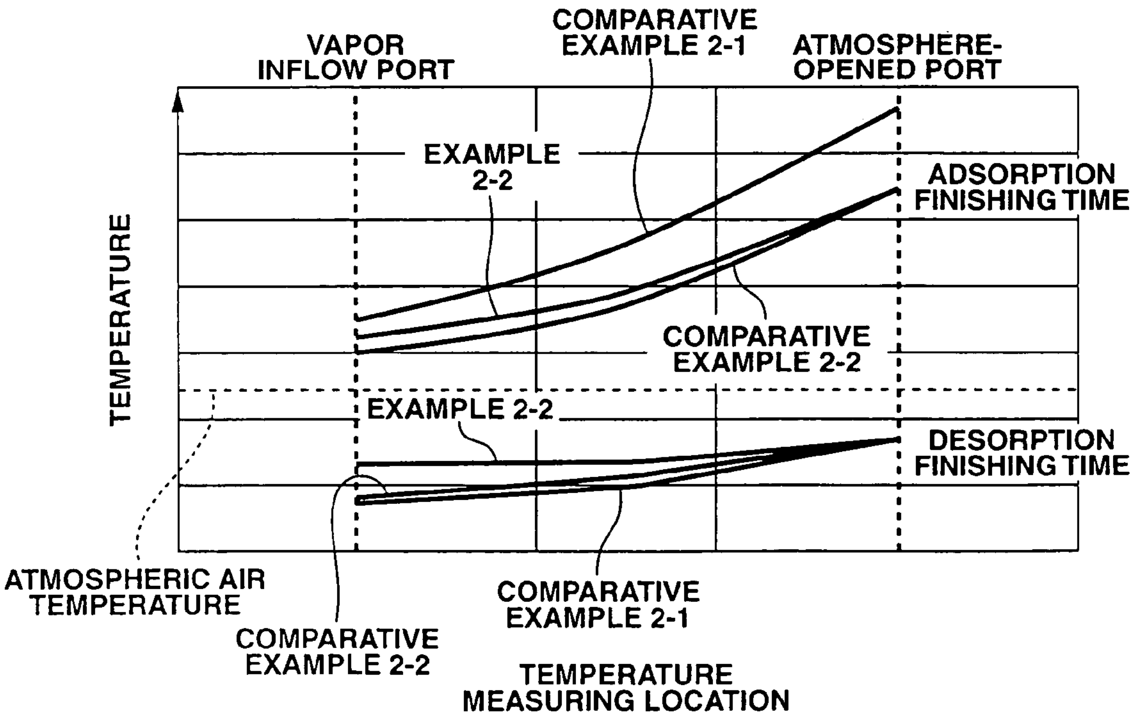
FIG. 20 is a characteristic diagram showing temperature distribution at the gas adsorption time and at the gas desorption time in connection with the gas storage canisters of Examples and Comparative Examples.

FIG. 20 shows the results of measurement of the temperature distribution in each portion of the canister, especially, the temperature distribution at the adsorption finishing time and the temperature distribution at the desorption finishing time. The temperature of the canister basically increases as seen in Comparative Example 2-1 using the formed activated carbon only, to a level higher than that of the atmospheric temperature (25° C.) at the gas adsorption time, and becomes higher in the portion which are closer to the side of the atmosphere-opened port 6. The phase changing material for the formed heat accumulative agent (A) having a melting point of 36° C. is in a solid phase under the atmospheric temperature, and, when the temperature rises to a level not lower than the melting point, the phase changing material adsorbs latent heat to change into a liquid phase. Therefore, in Example 2-2 and Comparative Example 2-2, in which the formed heat accumulative agent (A) is contained, the temperature is held down owing to the latent heat adsorption effect to a lower level than Comparative Example 2-1. Especially, in the portion of Example 2-2 which is on the side of the atmosphere-opened port 6 at which a temperature rise is most noticeable, 20 wt % of the formed heat accumulative agent (A) is contained just as in Comparative Example 2-2, and therefore the temperature suppressing effect is obtained in the manner as Comparative Example 2-2.

At the desorption time, the temperature basically lowers to a level lower than the atmospheric temperature (25° C.)

just as seen in Comparative Example 1, and the temperature becomes lower in the portion closer to the side of the vapor inflow port 4 and vapor outflow port 5. The formed heat accumulative agent (A) of a melting point of 36° C. is already in a solid phase at the atmospheric temperature (25° C.). Therefore, even when the temperature lowers to a level lower than the atmospheric temperature due to a desorption operation, a phase change does not occur. Accordingly, in Comparative Example 2-2 in which the formed heat accumulative agent (A) is contained, a latent heat discharge effect is not obtained, and the temperature distribution becomes identical with that in Comparative Example 2-1. On the other hand, the phase changing material for the formed heat accumulative agent (B) having a melting point of 16° C. is in a liquid phase at the atmospheric temperature. When the temperature lowers to a level not higher than the melting point, the latent heat is discharged to change the phase into a solid phase. Therefore, in Example 2-2 containing this formed heat accumulative agent (B), the temperature is kept higher than those in Comparative Examples 2-1 and 2-2 owing to the latent heat discharge effect. Especially, in the portion of Example 2-2 which is on the side of the vapor inflow port 4 and vapor outflow port 5 in which a temperature drop is most noticeable, the formed heat accumulative agent (A) does not substantially exist, and 20 wt % of formed heat accumulative agent (B) is contained. This enables the temperature drop in this portion to be effectively held down.

Example 2-2 was described with reference to FIG. 20. In Example 2-1, basically identical operation and effects are obtained.

Figure 21:
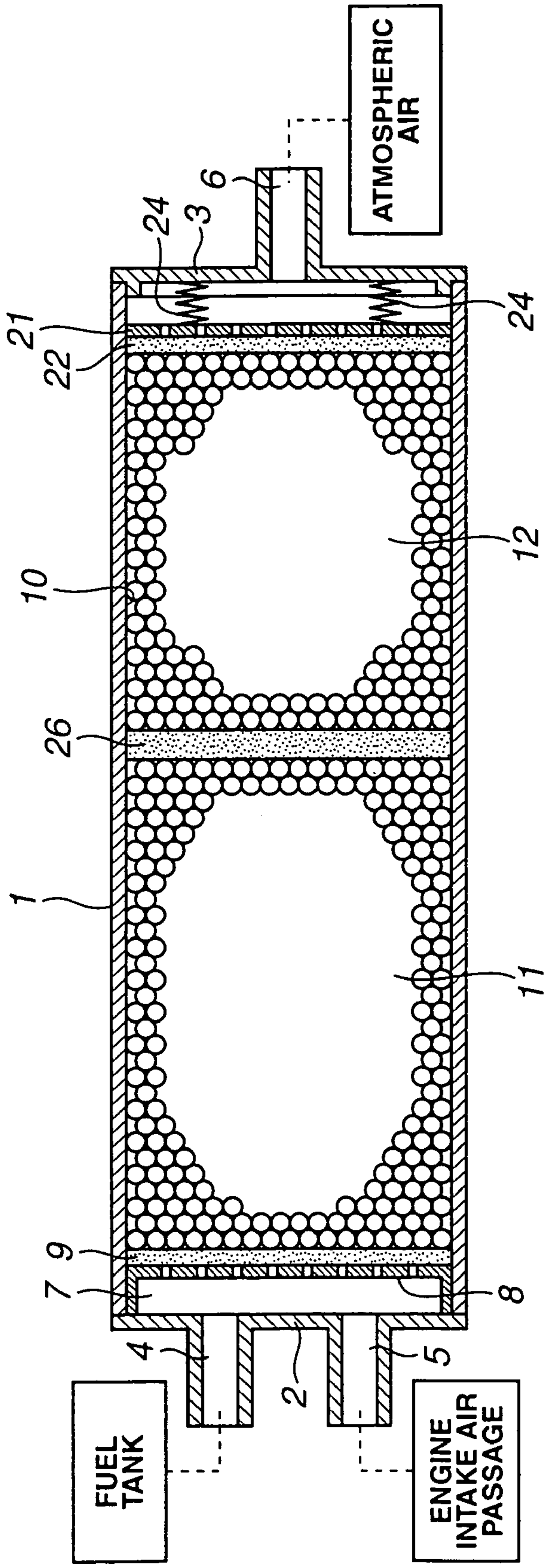
FIG. 21 is a cross-sectional view showing another concrete construction of the gas storage canister according the second embodiment of the present invention.

FIG. 21 shows a different concrete example of the above-mentioned canisters. In this structural example, a physical partition wall 26 is provided between two regions 11, 12 so that the formed heat accumulative agent in one region is not mixed with that in another region. The partition wall 26 is formed of circular filter members made of nonwoven fabric and the like having a gas permeability, and provided between the two regions. The partition wall 26 is not fixed specially to the case 1.

Figure 22:
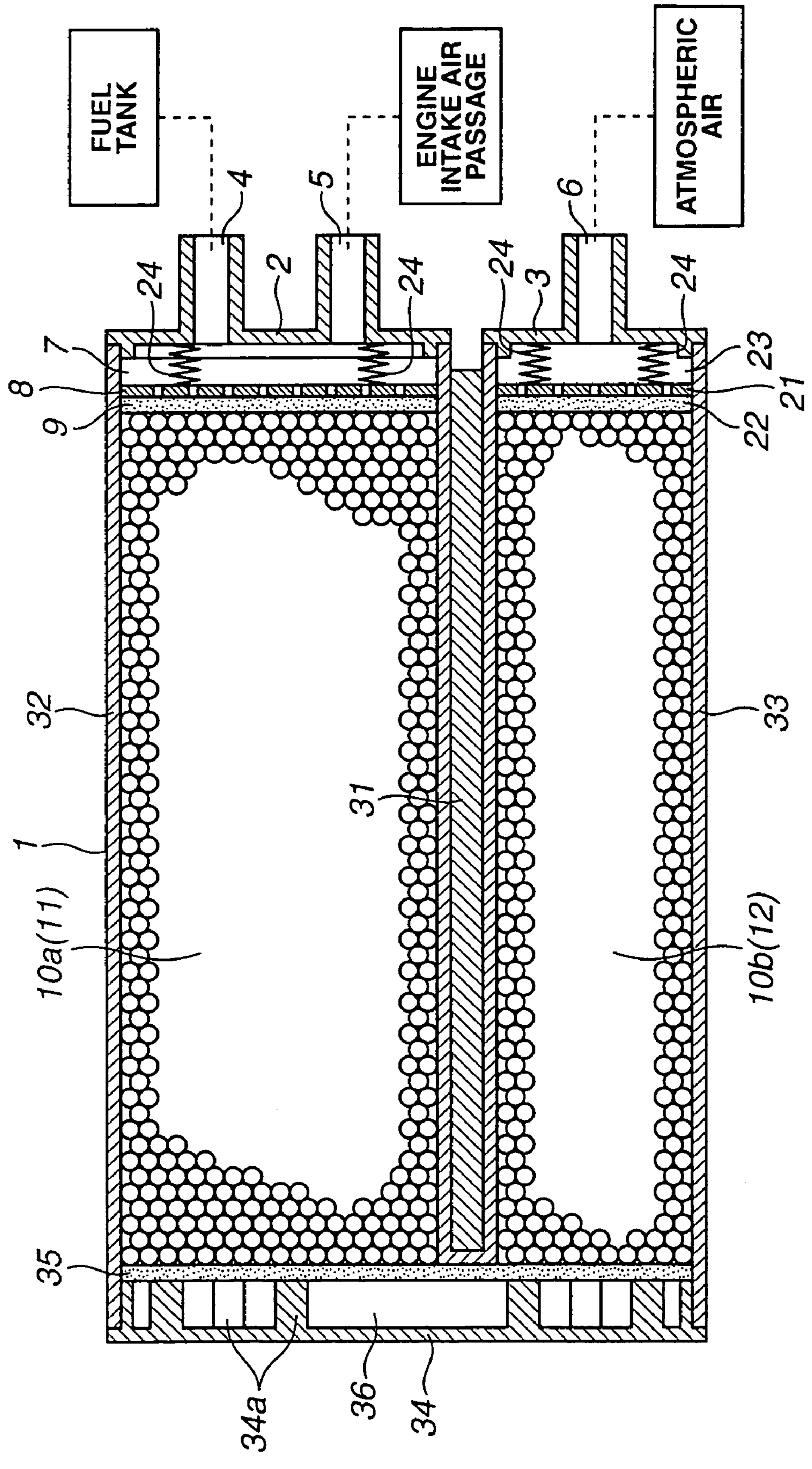
FIG. 22 is a cross-sectional view showing a further concrete construction of the gas storage canister according to the second embodiment.

The present invention can also be applied in the same manner as shown in FIG. 22 to a gas storage canister having a U-shaped flow passage. Namely, in this structural example, the case 1 as a whole is formed to a rectangular solid, which is divided by an intermediate partition wall 31 into a first case member 32 in an upper portion of the drawing, and a second case member 33 in a lower portion thereof. The first and second case members 32, 33 are both formed to rectangular solids, and one end of the first case member 32 is closed with an end wall 2 on the side of the inflow/outflow portion, one end of the second case member 33 being closed with an end wall 3 on the side of an atmosphere-opened port. The end wall 2 on the side of the inflow/outflow portion is provided with a vapor inflow port 4 connected to a fuel tank and a vapor outflow port 5 connected to an engine suction passage so that the ports are formed in parallel with each other. In the end wall 3 on the atmosphere-opened end, an atmosphere-opened port 6 is formed. In short, these three are provided on the same surface of the case 1. The end wall 2 on the side of the inflow/outflow portion is provided on the inner side thereof with a porous plate 8 and a sheet type filter member 9 which are arranged in a laminated manner with a clearance constituting a space 7 left. The end wall 3 on the side of the atmosphere-opened port is provided similarly on the inner side thereof with a flat porous plate 21 and a sheet type filter member 22, which are arranged in a laminated manner with a clearance constituting a space 23 left.

On the other end of the case 1, a communication end wall 34 is fixed, and a filter member 35 made of a nonwoven fabric and the like is provided so as to cover an opened port surface of the other ends of the first and second case members 32, 33. This filter member 35 is supported on a plurality of projections 34*a* formed on the communication end wall 34. As a result, a space 36 constituting a communication passage 36, which communicates the first case member 32 and second case member 33 with each other, is formed between the communication end wall 34 and filter member 35. Thus, the first gas adsorbing material housing space 10*a* is formed which is held between the two filter members 3 5, 9 in the first case member 32, and also a second gas adsorbing material housing space 10*b* is formed which is held between the two filter members 35, 22 in the second case member 33. These two gas adsorbing material housing spaces 10*a*, 10*b* are connected substantially in series as flow passages. Both between the end wall 3 on the side of the atmosphere-opened port and porous plate 21, and, between the end wall 2 on the side of the inflow/outflow portion and porous plate 8, a plurality of compression coiled springs 24 are provided respectively.

Even in such a U-shaped canister, the substance thereof does not differ at all as compared with that of the linear canister shown in FIG. 17 and FIG. 21. The distribution of the heat accumulative agent in Example 1-1 or Example 1-2 can be applied to the U-shaped canister in the same manner. Especially, when the interior of the case is partitioned into two regions 11, 12 as in Example 1, it is possible to set the first gas adsorbing material housing space 10*a* as the first region 11, and the second gas adsorbing material housing space 10*b* as the second region 12. The way of partitioning the interior of the case is not limited to this. Either of the gas adsorbing material housing spaces 10*a*, 10*b* can be partitioned into two regions 11, 12 in an intermediate position of the gas adsorbing material housing spaces 10*a*, 10*b*. It is also possible to provide a physical partition wall in an intermediate position in the same manner as shown in FIG. 21.

Example 2-3

Figure 23:
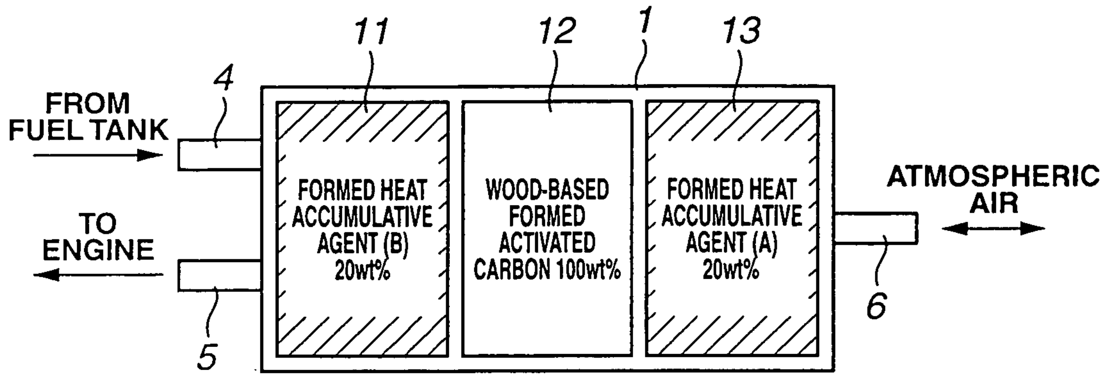
FIG. 23 is an explanatory view of the gas storage canister of Example 2-3 according to the second embodiment of the present invention.

In Example 2-3, the interior of the case was partitioned into three regions in the direction of flow as shown in FIG. 23. In short, from the side of a vapor inflow port 4 and vapor outflow port 5, a first region 11, a second region 12 and a third region 13 were formed in order. A uniform mixture of 20 wt % of the same formed heat accumulative agent (B) as mentioned above and 80 wt % of the same formed activated carbon as mentioned above was packed in the first region 11. A uniform mixture of 20 wt % of the same formed heat accumulative agent (A) as mentioned above and 80 wt % of the same formed activated carbon as mentioned above was packed in the third region 13. The same formed activated carbon only as was mentioned above was packed in the intermediate second region 12 in which an extreme temperature rise and an extreme temperature drop did not occur.

Example 2-4

Figure 24:
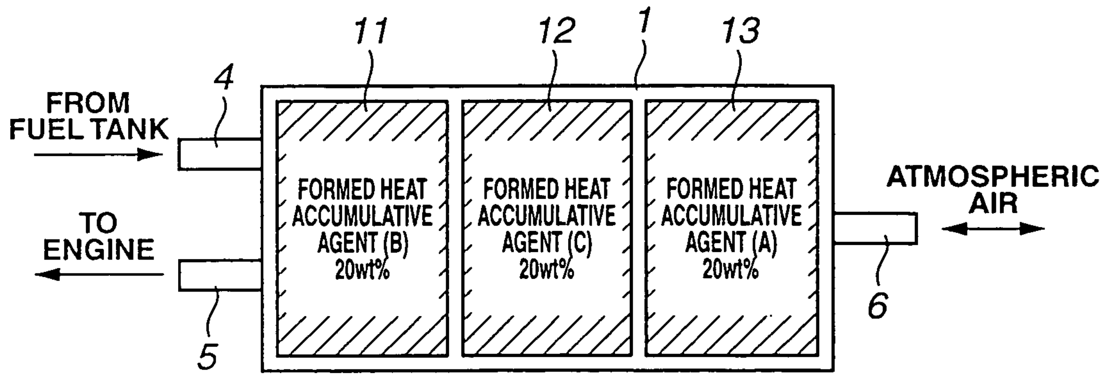
FIG. 24 is an explanatory view of the gas storage canister of Example 2-4 according to the second embodiment of the present invention.

As shown in FIG. 24, the interior of a case 1 was partitioned into three regions in the direction of flow in the same manner as in Example 2-3. A uniform mixture of 20 wt % of the formed heat accumulative agent (B) and 80 wt % of the formed activated carbon was packed in the first region 11, and a uniform mixture of 20 wt % of the formed heat accumulative agent (A) and 80 wt % of the formed activated carbon in the third region 13.

A columnar formed heat accumulative agent (C) was obtained by using n-octadecane as phase changing material by the same method as was described in Example 2-1. The phase changing temperature, i.e. the melting point of the n-octadecane is 28° C., which is between that of the formed heat accumulative agent (A) and that of the formed heat accumulative agent (B), and close to the above-mentioned atmospheric temperature (25° C.).

A uniform mixture of 20 wt % of the formed heat accumulative agent (C) and 80 wt % of the formed activated carbon was packed in the intermediate second region 12, to obtain a gas storage canister.

It is, of course, possible to partition the U-shaped canister shown in FIG. 22 and described above into not less than three regions.

Example 2-5

Figure 25:
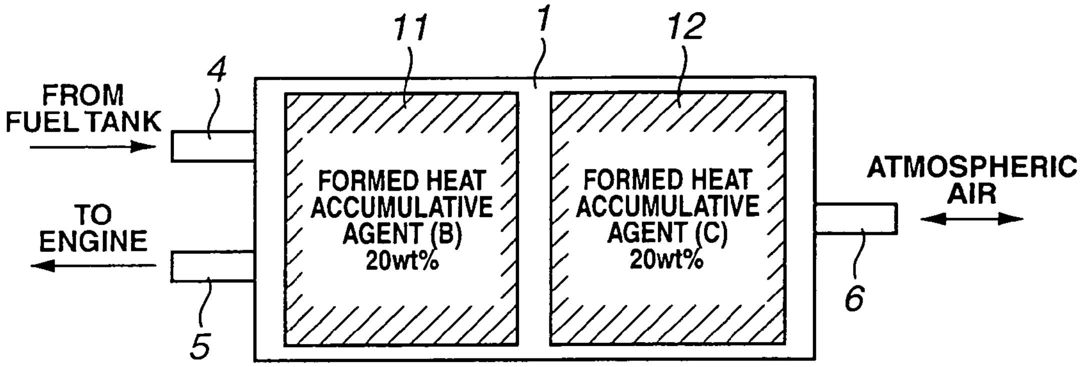
FIG. 25 is an explanatory view of the gas storage canister of Example 2-5 according to the second embodiment of the present invention.

As shown in FIG. 25, the interior of the case 1 is partitioned into two regions. A uniform mixture of 20 wt % of the formed heat accumulative agent (B) and 80 wt % of the formed activated carbon was packed in the first region 11, and a uniform mixture of 20 wt % of the formed heat accumulative agent (C) and 80 wt % of the formed activated carbon in the second region 12, to obtain a gas storage canister. In short, the formed heat accumulative agent (C) was used instead of the formed heat accumulative agent (A) in Example 2-1. The canister using the formed heat accumulative agent (C) is more suitably applied to a case where an atmospheric temperature assumed under the condition of use of the canister is in a further lower level, for example, 15° C., than that of the atmospheric temperature in Example 2-1.

Example 2-6

Figure 26:
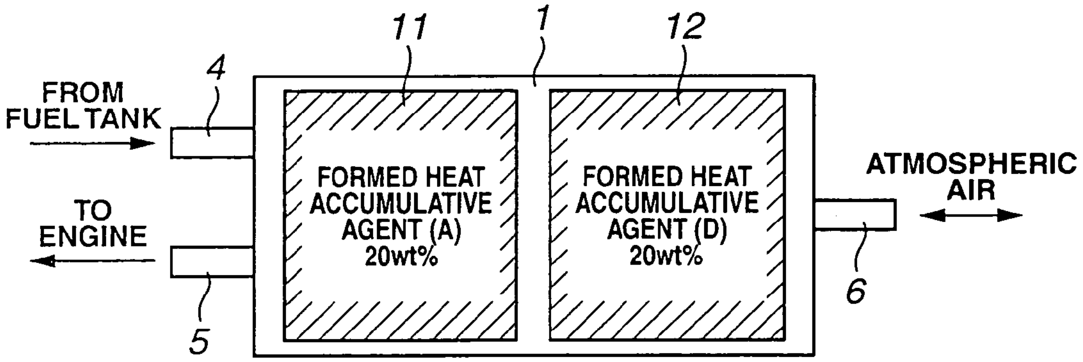
FIG. 26 is an explanatory view of the gas storage canister of Example 2-6 according to the second embodiment of the present invention.

Example 2-6 shown in FIG. 26 is suitably applied to a case where the atmospheric temperature assumed under the condition of use of the canister is conversely higher than the melting point (36° C.) of the phase changing material for the formed heat accumulative agent (A), for example, 45° C. A uniform mixture of 20 wt % of the formed heat accumulative agent (A) and 80 wt % of the formed activated carbon was packed in the first region, and 20 wt % of a formed heat accumulative agent (D) manufactured in the same manner by using a suitable phase changing material of a melting point of close to 55° C., and 80 wt % of the formed activated carbon in the second region 12, to obtain a gas storage canister.

Example 2-7

Figure 27:
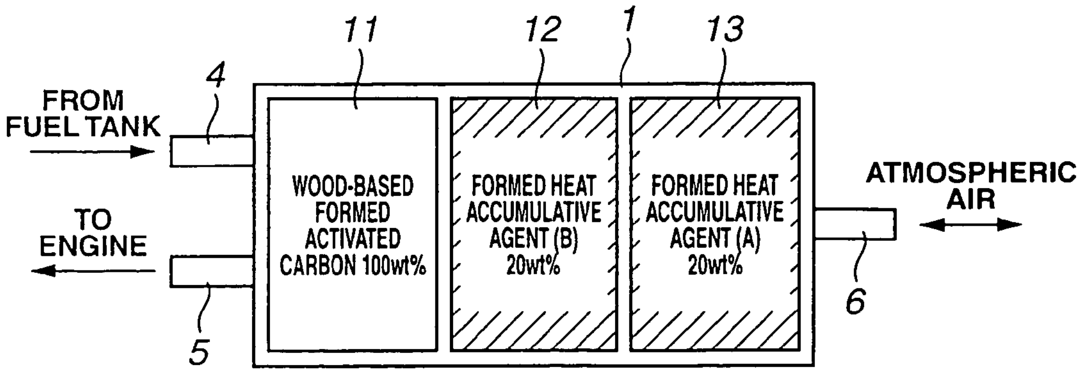
FIG. 27 is an explanatory view of the gas storage canister of Example 2-7 according to the second embodiment of the present invention.

As shown in FIG. 27, the interior of a case 1 was partitioned into three regions in the direction of flow in the same manner as in Example 3. In short, from the side of a vapor inflow port 4 and vapor outflow port 5, a first region 11, a second region 12 and a third region 13 were formed in the mentioned order. A uniform mixture of 20 wt % of the formed heat accumulative agent (B) and 80 wt % of the formed activated carbon was packed in the intermediate second region 12, and a uniform mixture of 20 wt % of the formed heat accumulative agent (A) and 80 wt % of the formed activated carbon in the third region 13. In the first region 11 into which fuel vapor flows first, the formed activated carbon only was packed. The activated carbon in this first region functions as a pretreatment layer when the deterioration of the activated carbon is noticeable, for example, due to the use of inferior fuel.

The entire contents of Japanese Patent Applications P2004-098381 (filed March 30) and P2004-098382 (filed March 30) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A gas storage canister, comprising:

a case including first and second end sections which are opposite to each other in a direction of flow of gas, the first and second having a gas inflow port and a gas outflow port, the second end section having an atmosphere-opened port;

a gas absorbing material disposed inside the case; and a heat accumulative agent including a phase changing material which causes absorption and release of latent heat to occur in accordance with a temperature variation, the heat accumulative material being mixed with the gas adsorbing material and disposed inside the case, wherein a mix proportion of the heat accumulative agent changes in the gas flow direction between the first and second end sections, and wherein the heat accumulative agent has a phase change temperature which is lower than temperature of atmospheric air in a condition where the gas storage canister is used, wherein the mix proportion of the heat accumulative agent is higher at a side of the first end section of the case, than that at a side of the second end section of the case.

2. A gas storage canister as claimed in claim 1, wherein interior of the case is divided into a plurality of regions which are arranged in the gas flow direction, wherein the mix proportion of the heat accumulative agent in each region changes stepwise in the gas flow direction so that each region is different in mix proportion of the heat accumulative agent.

3. A gas storage canister as claimed in claim 2, wherein the plurality of regions includes a region containing only the gas adsorbing material without containing the heat accumulative agent.

4. A gas storage canister, comprising:

a case including first and second end sections which are opposite to each other in a direction of flow of gas, the first and second having a gas inflow port and a gas outflow port, the second end section having an atmosphere-opened port;

a gas absorbing material disposed inside the case; and a heat accumulative agent including a phase changing material which causes absorption and release of latent heat to occur in accordance with a temperature variation, the heat accumulative material being mixed with the gas adsorbing material and disposed inside the case, wherein a mix proportion of the heat accumulative agent changes in the gas flow direction between the first and second end sections, wherein the mix proportion of the heat accumulative agent changes continuously in the gas flow direction.

5. A gas storage canister as claimed in claim 4, wherein the heat accumulative agent is granular formed heat accumulative agent including fine heat accumulative agent formed of micro-capsules each of which contains the phase changing material, and a binder for binding the fine heat accumulative agent, wherein the formed heat accumulative agent is mixed with the gas adsorbing material to be disposed in the case.

6. A gas storage canister as claimed in claim 4, wherein the heat accumulative agent has a phase change temperature which is higher than temperature of atmospheric air in a condition where the gas storage canister is used, wherein the mix proportion of the heat accumulative agent is higher at a side of the second end section of the case, than that at a side of the first end section of the case.

7. A gas storage canister as claimed in claim 4, wherein the mix proportion of the heat accumulative agent in each of portions inside the case is within a range of from 0 to 40 wt %.

8. A gas storage canister comprising:

a case including first and second end sections which are opposite to each other in a direction of flow of gas, the first end section having a gas inflow port and a gas outflow port, the second end section having an atmosphere-opened port;

a gas adsorbing material disposed inside the case; and a heat accumulative agent including a phase changing material which causes absorption and release of latent heat to occur in accordance with a temperature variation, the heat accumulative material being mixed with the gas adsorbing material and disposed in the case, wherein the heat accumulative agent includes a plurality of kinds of heat accumulative agents which are different in phase change temperature from each other, wherein quantities of the heat accumulative agents are different respectively at locations along the gas flow direction between the first and second end sections.

9. A gas storage canister as claimed in claim 8, wherein the quantity of the heat accumulative agent higher in phase change temperature than the other heat accumulative agent is larger at a side of the second end section of the case, than that at a side of the first end section of the case.

10. A gas storage canister as claimed in claim 8, wherein interior of the case is divided into a plurality of regions which are arranged in the gas flow direction, wherein the heat accumulative agents different in phase change temperature are disposed respectively in the plurality of regions.

11. A gas storage canister as claimed in claim 10, wherein interior of the case is divided into not less than three regions which are arranged in the gas flow direction, wherein the heat accumulative agents different in phase change temperature are disposed respectively in the not less than three regions.

12. A gas storage canister as claimed in claim 10, wherein the plurality of regions includes a region containing only the gas adsorbing material without containing the heat accumulative agent.

13. A gas storage canister as claimed in claim 8, wherein mix proportions of the heat accumulative agents different in phase change temperature changes continuously in the gas flow direction.

14. A gas storage canister as claimed in claim 8, wherein interior of the case is divided into a plurality of regions which are arranged in the gas flow direction, wherein mix proportions of the heat accumulative agents different in phase change temperature are different respectively at the plurality of regions.

15. A gas storage canister as claimed in claim 8, wherein the plurality of heat accumulative materials include first and second heat accumulative agents, the first heat accumulative agent having a phase change temperature higher than temperature of atmospheric air in a condition where the gas storage canister is used, the second heat accumulative agent having a phase change temperature lower than the atmospheric air temperature, a quantity of the first heat accumulative agent being larger at a side of the second end section of the case, than that at a side of the first end section of the case, a quantity of the second heat accumulative agent being larger at the side of the first end section of the case, than that at the side of the second end section of the case.

16. A gas storage canister as claimed in claim 8, wherein the heat accumulative agent is granular formed heat accumulative agent including fine heat accumulative agent formed of micro-capsules each of which contains the phase changing material, and a binder for binding the fine heat accumulative agent, wherein the formed heat accumulative agent is mixed with the gas adsorbing material to be disposed in the case.

* * * * *